United States Patent [19]
Brown

[11] Patent Number: 5,822,406
[45] Date of Patent: Oct. 13, 1998

[54] SWITCHING CIRCUIT FOR AUTOMATICALLY ROUTING AUDIO AND DATA SIGNALS BETWEEN A MODEM, TELEPHONE, AND I/O DEVICES

[75] Inventor: Paul Brown, Pleasanton, Calif.

[73] Assignee: Cirrus Logic, Inc., Fremont, Calif.

[21] Appl. No.: 938,142

[22] Filed: Sep. 26, 1997

Related U.S. Application Data

[63] Continuation of Ser. No. 536,025, Sep. 29, 1995, abandoned.

[51] Int. Cl.$^6$ ...................................................... H04M 1/64
[52] U.S. Cl. ...................... 379/88; 379/93.06; 379/93.11; 379/100.09; 379/100.16
[58] Field of Search .................................. 379/67, 88, 89, 379/93.01, 93.05, 93.06, 93.09, 93.11, 100.09, 100.15, 100.16

[56] References Cited

U.S. PATENT DOCUMENTS

| | | | |
|---|---|---|---|
| 5,192,999 | 3/1993 | Graczyk et al. | 379/88 |
| 5,283,819 | 2/1994 | Glick et al. | 379/90 |
| 5,452,289 | 9/1995 | Sharma et al. | 379/93 |
| 5,515,423 | 5/1996 | Beck et al. | 379/93 |
| 5,533,105 | 7/1996 | Brown et al. | 379/88 |
| 5,535,265 | 7/1996 | Suwandhaputra | 379/88 |

*Primary Examiner*—Fan S. Tsang
*Attorney, Agent, or Firm*—Frank D. Nguyen

[57] ABSTRACT

The present invention pertains to a detection and switching circuit for processing and then routing signals between various devices (e.g., modem, telephone, speaker-phone, external or on-board speakers, microphone, etc.) coupled to a computer system. First, a user plugs the desired devices to the computer system. Next, the user selects amongst several different modes of operation. The circuit monitors the status of these various devices and the status of the incoming signals on the phone line. The resident software then processes the signals (e.g., analog audio signals or digital data signals) into the particular formats corresponding to these particular devices. Finally, the switches are set to route the signals to the appropriate devices. The processing and switching steps are performed automatically in accordance with the particular mode that the user has selected.

12 Claims, 21 Drawing Sheets

SWITCHING CIRCUIT FOR AUTOMATICALLY ROUTING AUDIO AND DATA SIGNALS BETWEEN A MODEM, TELEPHONE, AND I/O DEVICES

This application is a File-Wrapper Continuation of U.S. patent application entitled, "SWITCHING CIRCUIT FOR AUTOMATICALLY ROUTING AUDIO AND DATA SIGNALS BETWEEN A MODEM AND VARIOUS DEVICES ACCORDING TO A SELECTED MODE OF OPERATION" Ser. No.: 08/536,025 Filed Sep. 29, 1995, now abandoned.

FIELD OF THE INVENTION

The present invention pertains to the field of switching circuits. More specifically, the present invention relates to a switching circuit that automatically routes audio and data signals between a modem and various devices coupled to the modem according to a mode of operation selected by a user.

BACKGROUND OF THE INVENTION

Virtually every office has a telephone so that its occupant can carry on voice conversations. Today's offices also typically include a personal computer that allows the user to process and store data digitally. A modem is often hooked up to the computer so that the computer can transmit and receive data digitally. This allows the user to communicate electronically via facsimiles or data file transfers.

Presently, the telephone and the computer/modem operate independently from each other. However, each of these devices requires a phone line as a transmission medium through which the signals are carried. Hence, the telephone is typically connected directly to a phone line, and the modem also has its own separate, dedicated phone line. The drawback to having two different phone lines is the added expenses associated with installing both lines and paying two monthly service fees.

One possible solution is to utilize a switch that selects either the modem or telephone to be coupled onto a phone line. This allows both devices to share a single phone line. Sometimes a user might wish to employ other types of devices, such as a headset and microphone for hands-free conversations, external speakers for conference calls, etc. If each of these devices were to operate independently, the user would have to remember to manually switch between each of these devices to provide him or her with the desired function. For example, if the user wishes incoming calls to be routed to the speaker, the user would have to set the appropriate switching combination. If, during the conference call, someone wishes to hold a private conversation over the handset, the switches would have to be set accordingly. After hanging up, the switches would have to be reset to their starting positions so that incoming calls default to the speaker phone as desired.

Clearly, this type of arrangement is very cumbersome and burdensome. It requires technical expertise to initially configure the hardware interconnections and switching network for the various devices. Furthermore, it requires specialized knowledge to know the exact settings for the switches for each of the functionalities. Adding and deleting devices would be very time-consuming and would entail retraining the user. Also, it is quite a nuisance to require a user to manually activate the proper switches each and every time he or she wishes to utilize a different device.

A more elegant solution is to provide a modem with audio features. Such a modem would have the capability of handling both voice/audio and data transmissions. This would give greater flexibility in that the user can either alternatively or simultaneously transmit and receive voice/audio, as well as data transmissions.

Even so, one still needs to switch between the various devices. Thus, there is a need in the prior art for a switching network that has the capability of detecting the status of the various devices and automatically performing the switching in a manner to share a single phone line in a manner that is transparent to the user. It would be highly preferable if such a switching and detection circuit could be easily set up and programmed to operate in different modes according to the personal preferences of individual users.

SUMMARY OF THE INVENTION

The present invention pertains to a detection and switching circuit for switching between various devices (e.g., modem, telephone, speaker-phone, external or on-board speakers, microphone, etc.) coupled to a computer system. A user can select amongst several different modes of operation via the computer system. The circuit monitors the status of these various devices and the status of the incoming signals on the phone line. The resident software then directs the switching circuit to make the proper connections, in accordance with the particular mode that the user has selected.

In the present invention, analog audio signals, as well as digital data signals, are processed and routed to their correct destinations by the switching circuit. The detection of the devices' status, the processing of the various audio and data signals, and the setting of the switches are all performed automatically and are transparent to the user. Thereby, the user simply plugs the various devices into the computer system and selects the mode corresponding to the desired functionalities.

DETAILED DESCRIPTION OF THE INVENTION

A detailed description of the detection and switching circuit of the present invention is set forth below. It should be noted that in the following detailed description, numerous specific details are set forth in order to provide a thorough understanding of the present invention. However, it will be obvious to one skilled in the art that the present invention may be practiced without these specific details. In other instances, well known methods, procedures, components, and circuits have not been described in detail as not to unnecessarily obscure the present invention.

Figure 1A:
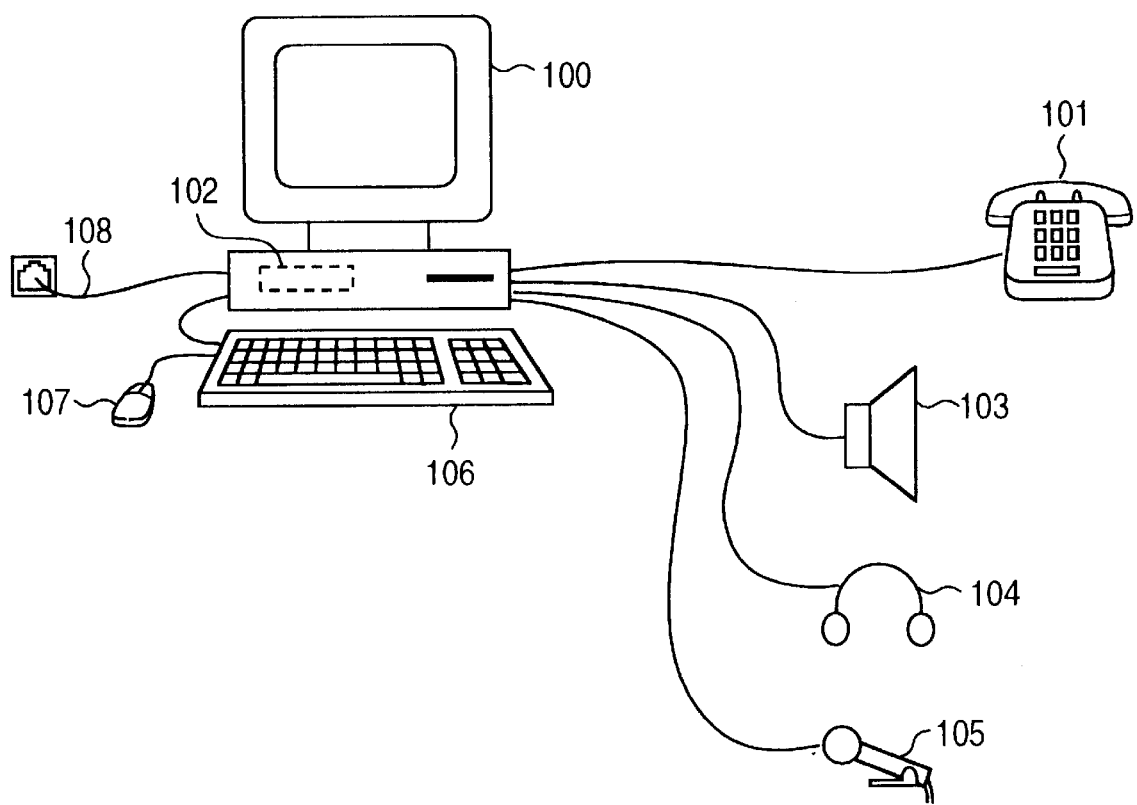
FIG. 1A shows a computer system 100 that is coupled to a telephone set, a modem, speaker, headset, and microphone.

FIG. 1A shows a computer system 100 that is coupled to a telephone set 101, a modem 102, speaker 103, headset 104, and microphone 105. Computer system 100 includes a microprocessor for processing data, memory (e.g., RAM, ROM, or hard disk drive) for storing software and data files, and I/O interfaces. The telephone set 101 allows full duplex voice communications over phone line 108, whereas modem 102 enables computer system 100 to transmit and send data digitally over the phone line 108. Modem 102 also has the capability of handling full duplex voice communications (e.g., in the telephone emulation, headset, and full duplex speaker-phone modes described in detail below). In the currently preferred embodiment, modem 102 contains a switching circuit that allows a communications path to be established to any of the various devices coupled to computer system 100. In addition, the switching circuit also includes hardware that detects the status of the various devices coupled to computer system 100. Modem 102 can be a separate unit that is plugged into the computer system 100. Alternatively, modem 102 may reside internal to the host computer system 100. Other units which may also be coupled to computer system 100 include a speaker 103, headset 104, and microphone 105. Speaker 103 may be an external speaker or an on-board speaker existing within computer system 100.

Also coupled to computer system 100 is a keyboard 106 and mouse 107. The keyboard 106 and mouse 107 allows a user to select a particularly desired mode of operation with respect to the various devices coupled to the computer system 100. A user may select the mode by typing it on the keyboard. Alternatively, the mode may be selected by pointing and clicking a cursor on the appropriate radio button of a graphic user interface displayed on the monitor of the computer system 100 via mouse 107. Depending on which mode is selected by the user and the status of the various devices as indicated by the hardware, the switching circuit automatically makes the proper connections. It should be noted that the present invention may be practiced with all or a subset of the units and devices described above or any combination thereof.

Figure 1B:
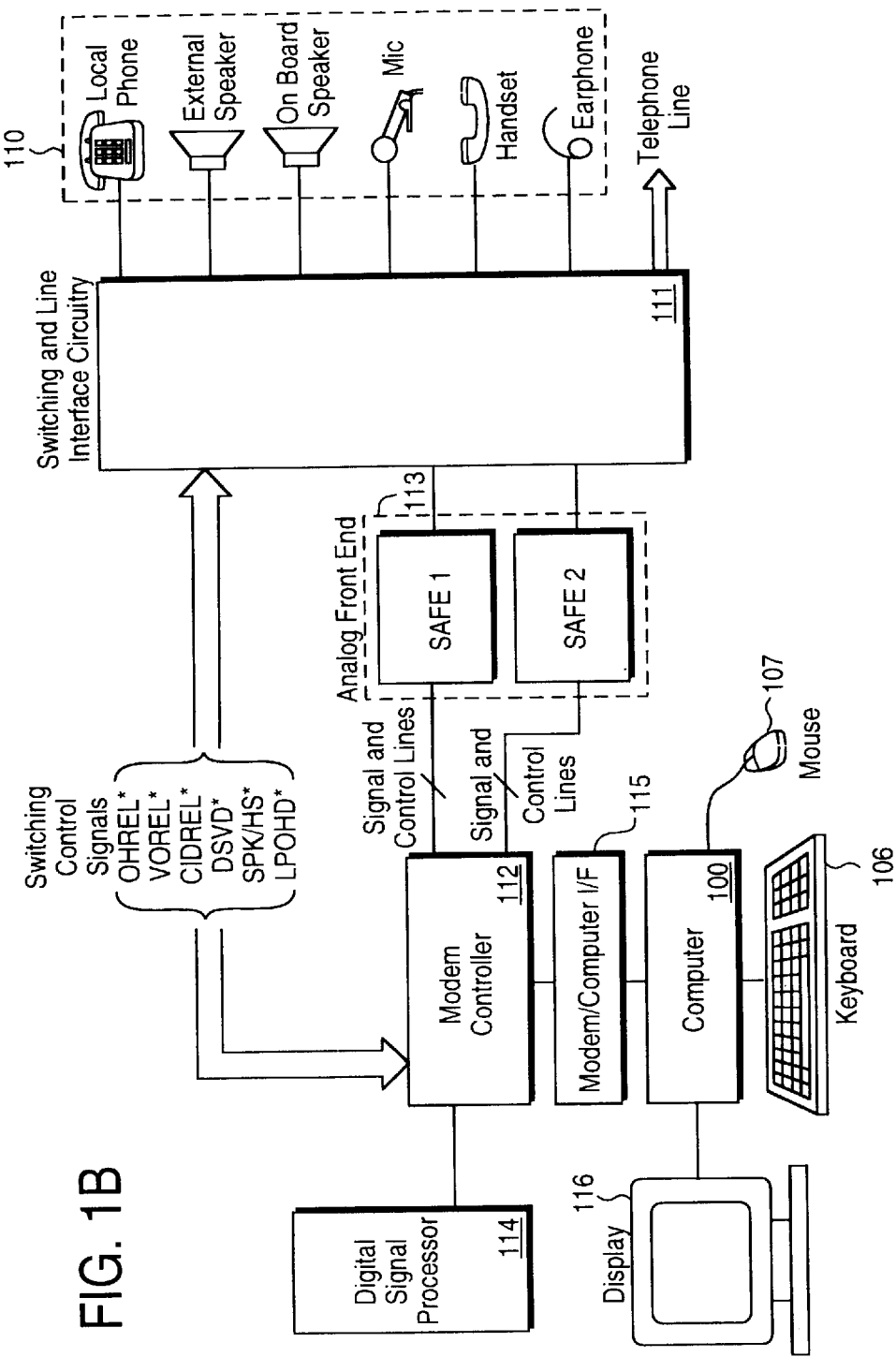
FIG. 1B shows a system block diagram of one embodiment of how the detection and switching circuit of the present invention may be interfaced with the computer system, modem, and the various communication devices.

FIG. 1B shows a system block diagram of one embodiment of how the detection and switching circuit of the present invention may be interfaced with the computer system, modem, and the various communication devices. The various communication devices 110 (e.g., local phone, external speaker, on-board speaker, handset, earphone, etc.) are coupled to the switching and line interface circuitry 111. A number of switching control signals (e.g., OHREL*, VOREL*, CIDREL*, DSVD*, and SPK/HS*) are sent by the modem controller 112 to control the relays of the switching and line interface circuitry 111. These switching control signals are generated by the modem controller 112 in accordance With an application program. When a user selects a particular mode of operation, the application program informs the modem controller to send the appropriate switching signals to the switching and line interface circuitry 111. In addition, the switching and line interface circuitry 111 sends a LPOHD* signal to the modem controller 112. The LPOHD* signal informs modem controller 112 as to whether the local phone is off-hook. In addition, modem controller 112 is also coupled to the analog front end 113 by multiple signal and control lines. In turn, the analog front end 113 is coupled to the switching and line interface circuitry 111. The functions and interface between the analog front end 113 and switching and line interface circuitry 111 is described in detail below. Two other circuits are also coupled to modem controller 112. A digital signal processor 114 is used to process the digital signals received from the modem controller 112. A modem/computer interface circuit 115 is used to interface the modem controller 112 to computer system 100. A keyboard 106, mouse 107, and display 116 are common devices coupled to computer system 100 for facilitating human interface with the computer.

Figure 2:
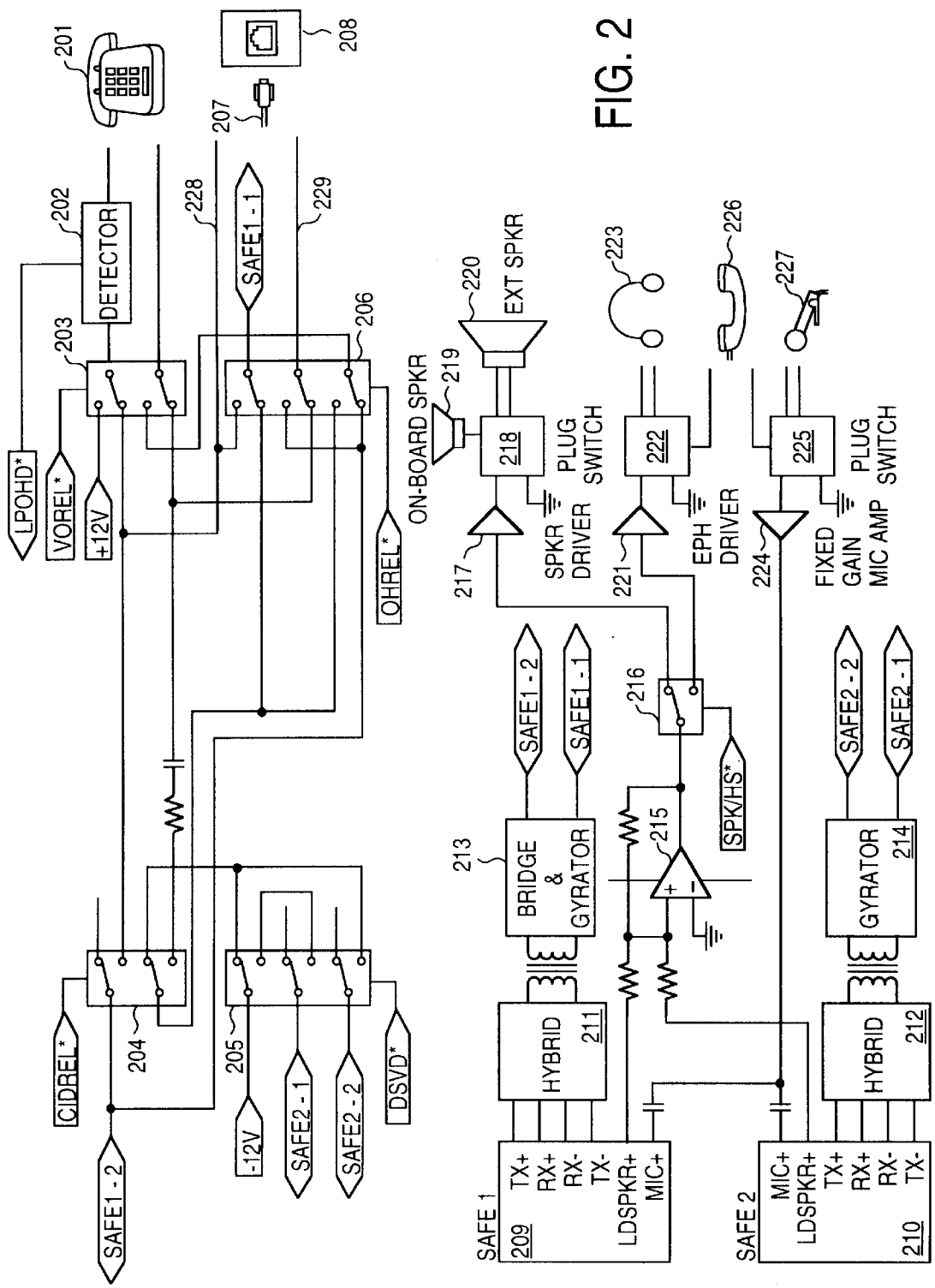
FIG. 2 shows an overall schematic of a detection and switching circuit of the currently preferred embodiment of the present invention.

FIG. 2 shows an overall schematic of a detection and switching circuit of the currently preferred embodiment of the present invention. A standard telephone set 201 is coupled to detector 202 and also to relay 203. Detector 202 transmits a logic low signal "local phone off-hook detect" (LPOHD), which informs the computer system that the phone has been picked up. Relay 203 contains two single-pole dual throw switches. Phone cord 207 is coupled at one end to the detection and switching circuit via lines 228 and 229 and at the other end to a phone jack 208. The four relays 203–206 route the audio and/or digital signals to the appropriate destinations. These relays should meet the FCC part 68 specification for the telephone system. The specification sets forth the requirement that there be 1500 volt contactto-contact isolation. This is significant because, under certain circumstances, one or more of these relays are connected to the low voltage part of the circuit and in other cases, its connected to the high voltage part of the circuit (mainly the telephone lines). In addition, there should also be 1500 volt isolation between any of the contacts and the control coil because it is driven by the low voltage part of the circuit.

The two sigma-delta analog front end (SAFE) chips 209 and 210 are used to convert analog signals to digital signals and vice-versa. More specifically, analog signals input to SAFE 209 and 210 are converted into digital signals and then sent to the controller and DSP chips for processing. Furthermore, digital signals originating from the controller and DSP chips are converted into an analog format for transmission over the phone line. The reason why two SAFEs are used is because in one of the modes, the first SAFE 209 is used to monitor the phone line while the other SAFE 210 is simultaneously digitizing the microphone 227. In another mode, known as "digital simultaneous voice and data" (DSVD), the first SAFE 209 is used to receive modem transmissions being sent by a remote modem. Meanwhile, SAFE 210 is used to digitize voice signals that are encoded into a data stream to be sent to the remote modem. Furthermore, any encoded voice messages sent by the remote modem is stripped and played back via the handset 226, headset 223, or speakers 219 and 220. In other words, in most modes, SAFE 209 generally handles the data interface, whereas SAFE 210 handles the voice interface. Referring to Table 1, it can be seen that modes 1–12 can be implemented by one SAFE, while modes 13–21 requires the use of two SAFE's.

Respectively coupled to SAFEs 209 and 210 are hybrids 211 and 212. It is the function of these hybrids to convert a two-wire phone line into a four-wire transmit and receive interface for the modem. Next, bridge and gyrator circuits 213 and 214 are transformer coupled to the hybrid circuits 211 and 212, respectively. The bridge and gyrator circuit 213 holds the phone line current and maintains the line connection to the central office.

The analog audio signal generated by either SAFE 209 or SAFE 210 for headset 223 or speakers 219 or 220 is first amplified by amplifier 215 and then connected to relay 216. Relay 216 determines whether the audio signal is to be routed to the speakers 219–220 or to the headset 223. If the relay 216 is directed by the software to route the audio signal to speakers 219–220, the audio signal is input to speaker driver 217. Plug switch 218 then determines whether to route the audio signal to an on-board speaker 219 or to an external speaker 220.

If the software directs relay 216 to route the audio signal to the headset, the audio signal is input to the earphone driver 221. Thereupon, a plug switch 222 is used to direct the audio signal to either a headset 223 or to a handset 226. Handset 226 is a standard handset from a telephone, which can be plugged into the computer system. Again, whether the audio signal is sent to the headset 223 or handset 226 is under software control.

Audio signals can be input to the detection and switching circuit by means of either a handset 226 or microphone 227. Often, the headset 223 and microphone 227 are integrated into a one-piece unit worn by the user to provide for hands-free operation. Plug switch 225 couples either the handset 226 or microphone 227 to the fixed gain microphone amplifier 224. The output signal from microphone amplifier 224 is then capacitavely coupled to SAFE 209 and SAFE 210 and ultimately, to the modem. It should be noted that whenever headset 223 and microphone 227 are plugged into the computer system, the plug switches 222 and 225 will automatically disable handset 226.

Table 1 below sets forth the different modes of operation corresponding to the detection and switching circuit. These different modes can be programmably selected by the user. It should be noted that additional modes of operation can be programmed to tailor the system to the needs of the user. In addition, all or just a subset of these different modes may be used in conjunction with the present invention.

TABLE 1

MODES OF OPERATION

| # | Mode | State of Relays | | | | State of AFE 1 | | State of AFE 2 | | SPK/HS[a] | Comments |
|---|---|---|---|---|---|---|---|---|---|---|---|
| | | Hook | Voice | CID | DSVD | A/D | SPKR | A/D | SPKR | | |
| 1 | DATA/FAX | ON | OFF | OFF | OFF | RX | TS + RX | OFF | OFF | 1 | |
| 2 | Local record thru phone | OFF | ON | OFF | OFF | RX | OFF | OFF | OFF | 1 | Monitor LPOHD* |
| 3 | Local playback thru phone | OFF | ON | OFF | OFF | OFF | OFF | OFF | OFF | 1 | Monitor LPOHD* |
| 4 | Record from line | ON | ON | OFF | OFF | RX | RX | OFF | OFF | 1 | Monitor LPOHD* |
| 5 | Playback to the Line | ON | ON | OFF | OFF | OFF | OFF.TX. TX + RX | OFF | OFF | 1 | Monitor LPOHD* |
| 6 | Local record thru Mic | OFF | ON | OFF | OFF | MIC | OFF | OFF | OFF | 1 | Monitor LPOHD* |
| 7 | Local playback thru Spkr | OFF | ON | OFF | OFF | OFF | TX | OFF | OFF | 1 | Monitor LPOHD* |
| 8 | Local playback thru Headset | OFF | OFF | OFF | OFF | OFF | TX | OFF | OFF | 0 | Monitor LPOHD* |
| 9 | Telephone Emulation | ON | ON | OFF | OFF | MIC | RX | OFF | OFF | 0 | Monitor LPOHD* |
| 10 | CID | OFF | OFF | ON | OFF | RX | OFF | OFF | OFF | 1 | Monitor LPOHD* |
| 11 | Voice View Local Phone-Monitoring start tones. | OFF | OFF | ON | OFF | RX | OFF | OFF | OFF | 1 | Monitor LPOHD* |
| 12 | Voice View Local Phone-Data transfer | ON | ON | OFF | OFF | RX | OFF (default) | OFF | OFF | 1 | Monitor LPOHD* |

TABLE 1-continued

MODES OF OPERATION

| # | Mode | State of Relays | | | | State of AFE 1 | | State of AFE 2 | | SPK/HS[a] | Comments |
|---|---|---|---|---|---|---|---|---|---|---|---|
| | | Hook | Voice | CID | DSVD | A/D | SPKR | A/D | SPKR | | |
| | | The following modes need two AFE's | | | | | | | | | |
| 13 | Voice View Spkrphone- Monitoring start tones. | ON | ON | OFF | OFF | RX | OFF | MIC | TX | 1 | Monitor LPOHD* |
| 14 | Voice View Spkrphone- Data transfer | ON | ON | OFF | OFF | RX | OFF (default) | OFF | OFF | 1 | Monitor LPOHD* |
| 15 | Voice View Headset- Monitoring start tones. | ON | ON | OFF | OFF | RX | OFF | MIC | TX | 0 | Monitor LPOHD* |
| 16 | Voice View Headset- Data transfer | ON | ON | OFF | OFF | RX | OFF | OFF | OFF | 0 | Monitor LPOHD* |
| 17 | DSVD Local phone | ON | ON | OFF | ON | RX | OFF | RX | OFF | 1 | Monitor LPOHD* |
| 18 | DSVD Spkrphone | ON | ON | OFF | ON | RX | OFF | MIC | TX | 1 | Monitor LPOHD* |
| 19 | DSVD | ON | ON | OFF | ON | RX | OFF | MIC | TX | 0 | Monitor LPOHD* |
| 20 | Spkr Phone | ON | ON | OFF | OFF | MIC | RX | MIC | TX | 1 | Monitor LPOHD* |
| 21 | Spkr Phone Headset | ON | ON | OFF | OFF | MIC | RX | MIC | TX | 0 | Monitor LPOHD* |

Notes
1. LPOHD* - Local Phone Off Hook Detect
2. Modes 1–12 do not require the second AFE. If the second AFE is on the board, the state of its A/D and SPKR should be OFF (as the table indicates).

Figure 3:
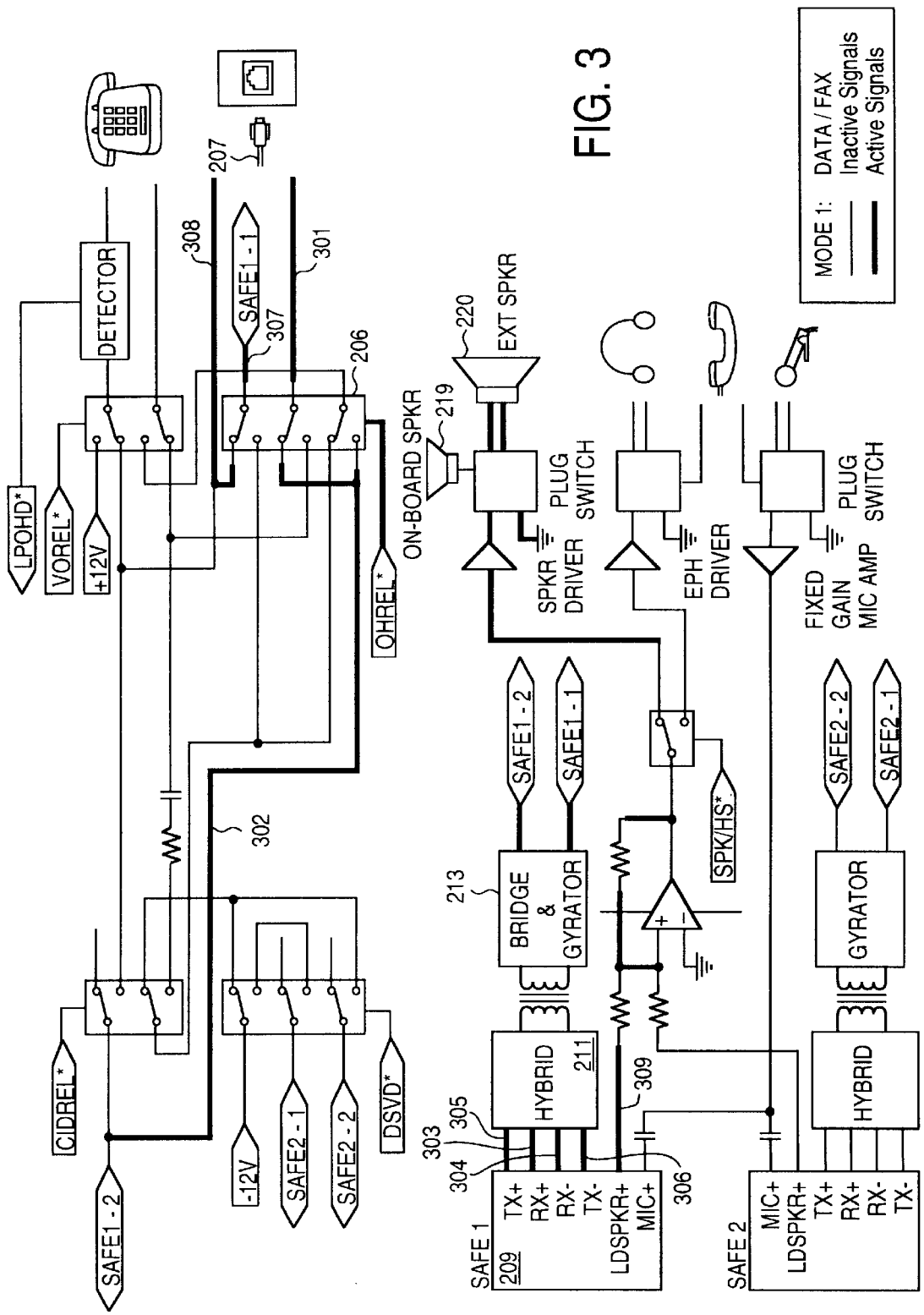
FIG. 3 shows a schematic of how the detection and switching circuit is configured for the DATA/FAX mode.

Each of these modes and their respective effects on the detection and switching circuit are now described in detail. Referring back to Table 1, the first mode is called DATA/FAX. In this mode, the modem is transmitting data (facsimile or data files) over the telephone line. FIG. 3 shows a schematic of how the detection and switching circuit is configured for the DATA/FAX, mode 1. An out-bound modem transmission is converted into an analog format by SAFE 209 and sent through hybrid 211 and bridge and gyrator 213 to relay 206. Relay 206 is set so that the analog signal is coupled to the phone line 207. Depending upon the software settings, a user can elect to monitor the progress of an out-bound modem transmission in this mode. If selected, the off-hook dial tone, the DTMF dialing, the ring-back signal, and the initial training of the modem can be audibly played via either the on-board speaker 219 or external speaker 220. Normally, the software directs the circuit to disable the speaker once the connection has been established.

In FIGS. 3–20, the signal lines that are active are highlighted. In other words, lines upon which data and/or voice signals are being carried, are drawn as thick, darkened lines. Those lines which are inactive are drawn in normal width. For example, in FIG. 3, the active signal paths for the DATA/FAX mode are shown by highlighted lines 301–309. An incoming fax is received on line 301. In mode 1, the OHREL* signal from the modem controller sets relay 206 so that line 301 is switched to establish an electrical connection to line 302 and the SAFE1-2 module. The incoming fax signal on the SAFE1-2 module is sent to bridge and gyrator 213. After processing by hybrid 211, the incoming fax signal is placed on the receive lines RX+ and RX− of SAFE 1 209 via lines 303 and 304. An outgoing fax signal originates from the modem and is output from the two transmit lines TX+ and TX− via lines 305 and 306 to the SAFE1-1 module. The OHREL* signal sets relay 206 so that the outgoing fax signal from the SAFE1-1 module of line 307 is electrically connected to line 308 and finally to jack 207. In addition, an audio signal is output from the LDSPKR+ output of SAFE1 209 to line 309. This audio signal is routed to the speaker to give the fax sender an audio feedback of the fax transmission initialization process.

Figure 4:
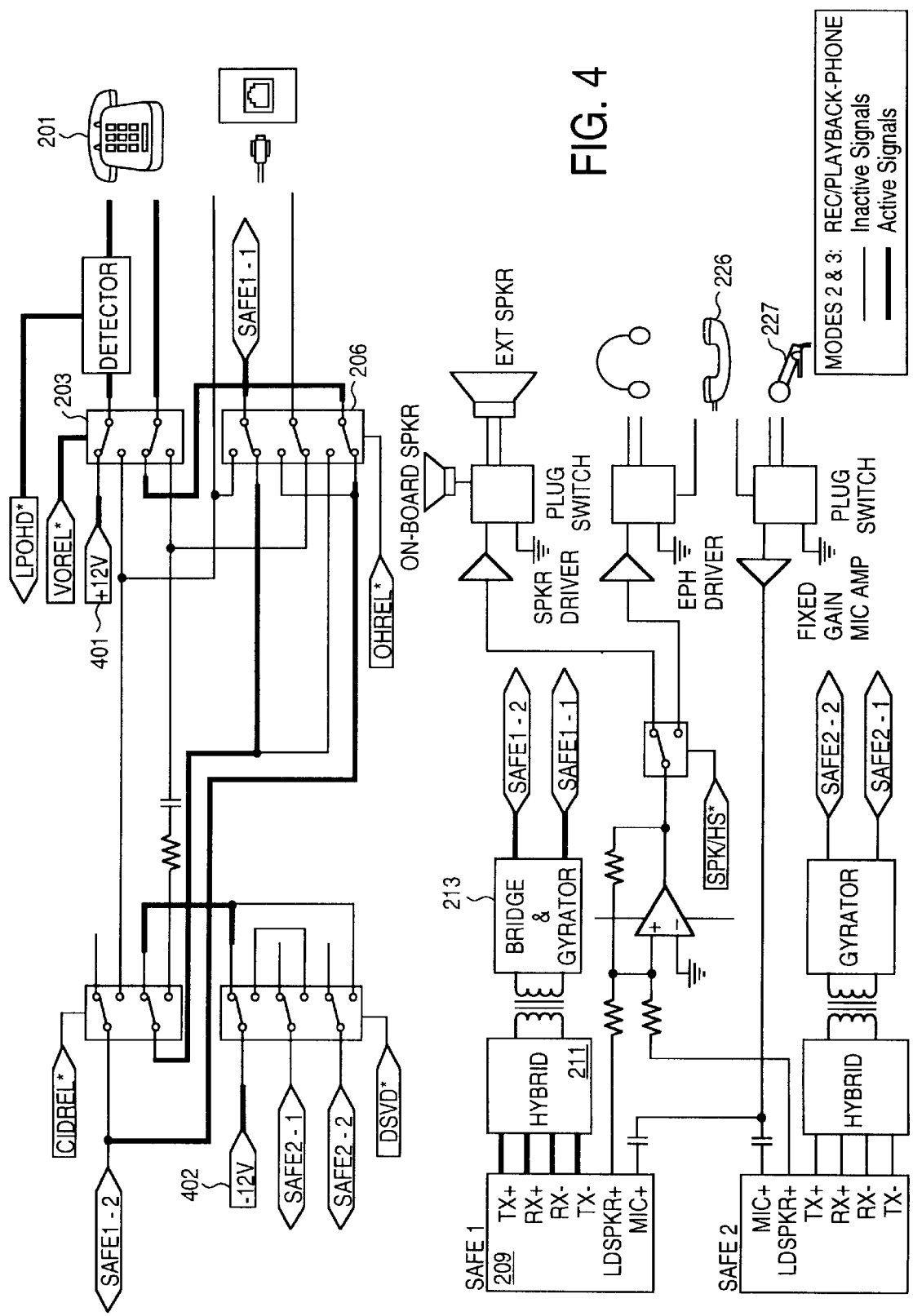
FIG. 4 shows the schematic of how the detection and switching circuit is configured for the REC/PLAYBACK-PHONE modes.

FIG. 4 shows the schematic of how the detection and switching circuit is configured for the REC/PLAYBACK-PHONE, modes 2 and 3. In mode 2, a user records a voice or other audio message information via the local telephone 201 or microphone 227. The audio is then recorded and stored on the computer system. In this mode, the VOREL* signal from the modem controller sets relay 203 so that +12 volts from the +12 volt source 401 is supplied to bias the telephone 201. The current through telephone 201 is modulated and routed through the other switch of relay 206 to the bridge and gyrator 213 (via the SAFE1-2 module) to SAFE 209. The return current path coming out of SAFE 209 is routed back through hybrid 211 and bridge and gyrator 213 to relay 206 (via the SAFE1-1 module) and then to the −12 volt source 402. It is this modulated signal that is used by the modem to store the audio onto the storage device of the computer system.

Conversely, mode 3 allows for the local playback of a stored audio information through the telephone 201. When the audio data stored on the computer system is played back, the stored digital data is converted by the SAFE 209 into an analog signal that is used to modulate the current flowing through telephone 201. This current is then demodulated by the telephone 201 and an audible reproduction is played back to the user. Essentially, the current path for mode 3 is the same as that described above for mode 2.

Figure 5:
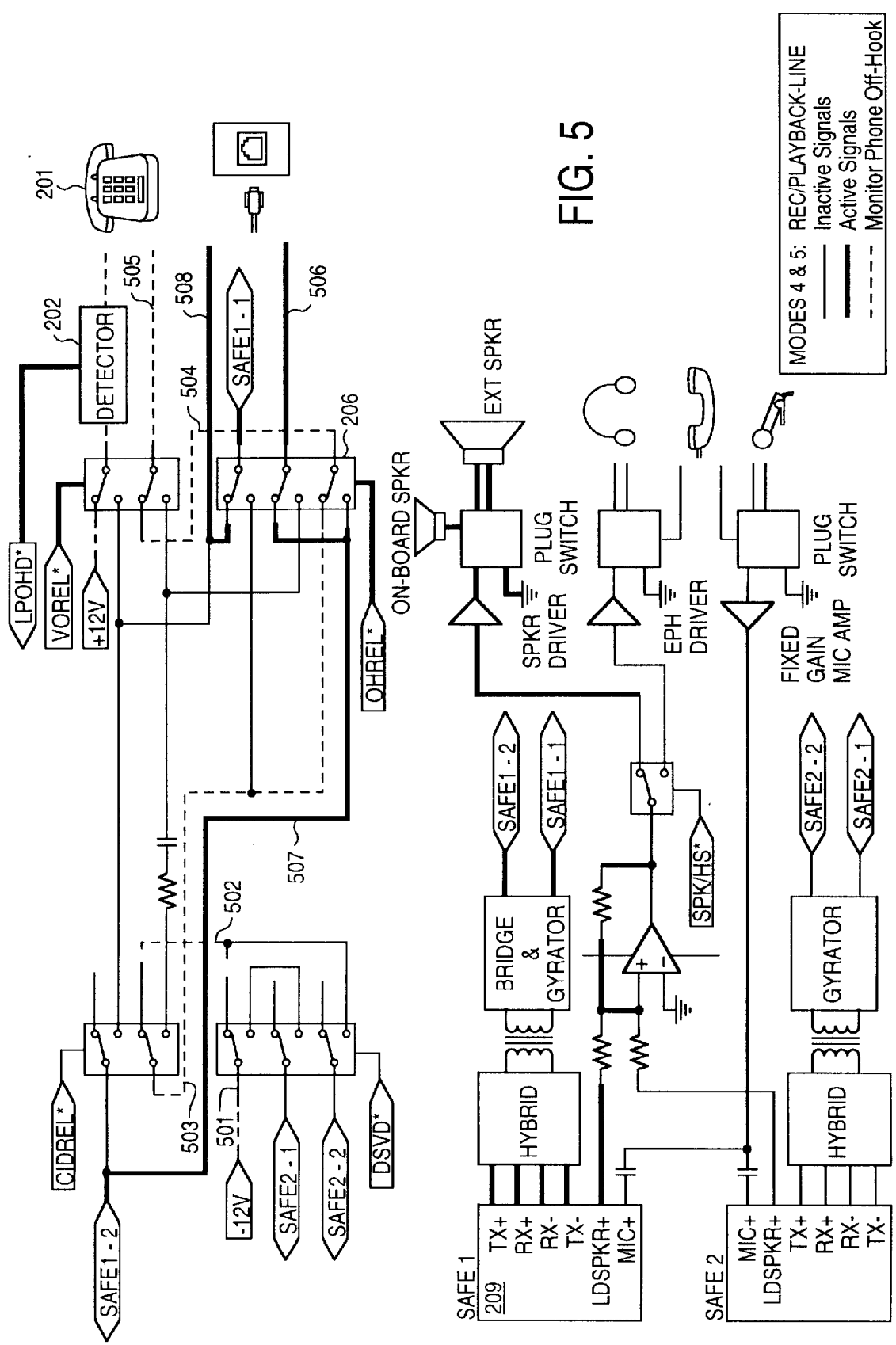
FIG. 5 shows the schematic of how the detection and switching circuit is configured for the REC/PLAYBACK-LINE modes.

FIG. 5 shows the schematic of how the detection and switching circuit is configured for the REC/PLAYBACK TO/FROM THE LINE, modes 4 and 5. In mode 4, an incoming call is recorded onto and stored by the computer system. To record from the line, the modem first detects that it's a voice call, whereupon the voice from the tip-and-ring line of telephone 201 is presented to the modem's analog front-end. The dashed lines of FIG. 5 represent the lines corresponding to the circuit used to detect whether the telephone has gone off-hook. The DSVD*, CIDREL*, OHREL*, and VOREL* control signals set their respective relays such that −12 volts is supplied to telephone 201 via lines 501–505. When the telephone goes off-hook, the detector 202 activates the LPOHD* signal. Thereupon, the firmware sets the modem up to record the message, similar to an answering machine. The incoming message is initially received on line 506. Relay 206 electrically connects line 506 to line 507 and the SAFE1-2 module under control of the OHREL* signal. The signal is then routed through the bridge and gyrator and hybrid circuits to SAFE1 209.

Similarly, a stored message can be played back in mode 5 by placing a call to the modem. When the modem answers, the user enters his or her password by initiating the appropriate DTMF tones. Upon verification, the modem would playback the messages to the user over the remote telephone. The user can also control various playback functions by issuing the appropriate DTMF tones. The message stored on the computer system is retrieved and processed by the modem and then converted into an analog audio signal by SAFE1 209. This analog audio signal can be played back through the SAFE1-1 module and line 508 to the remote telephone.

Figure 6:
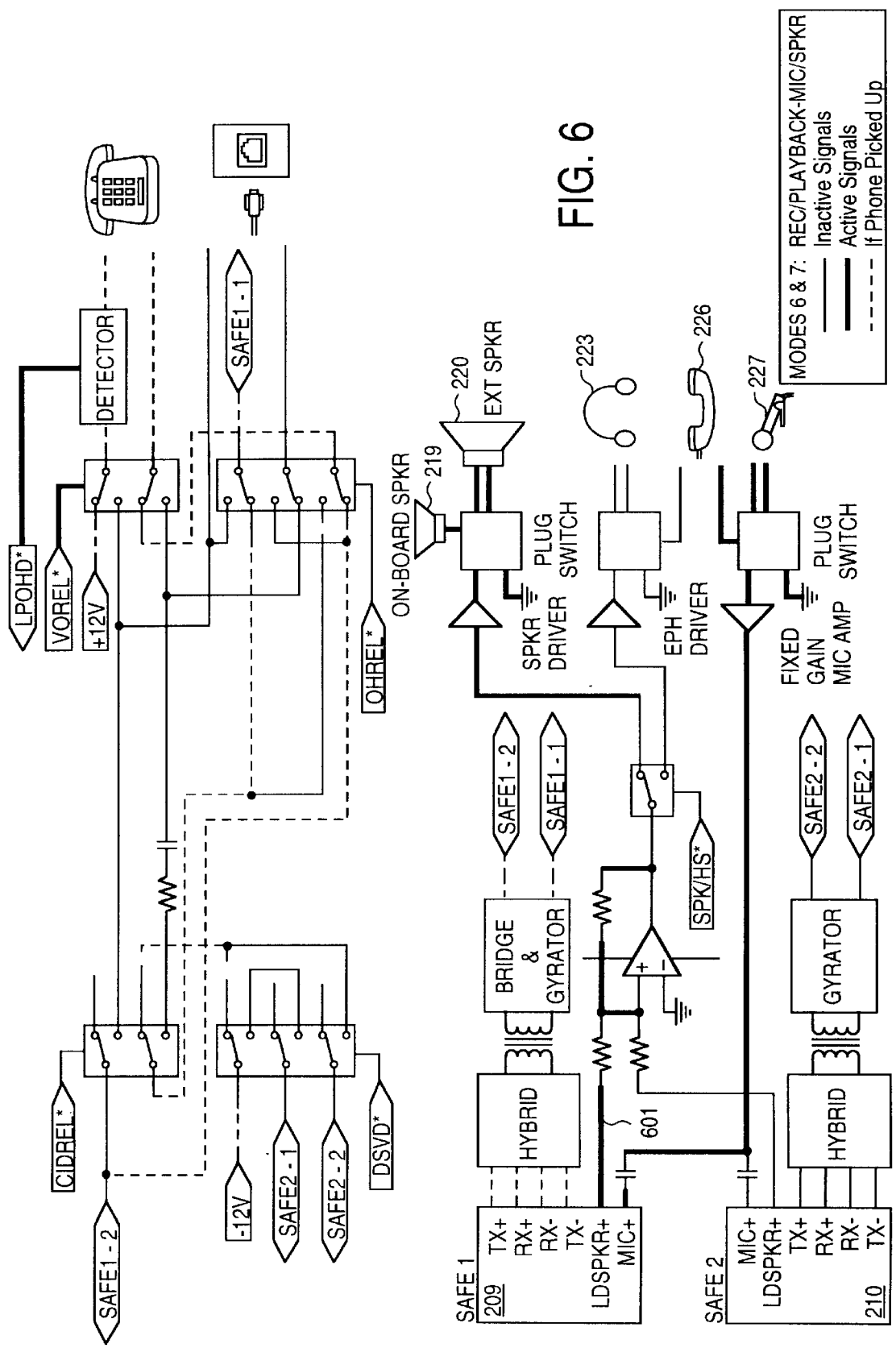
FIG. 6 shows the schematic of how the detection and switching circuit is configured for the REC/PLAYBACK-MIC/SPKR modes.

FIG. 6 shows the schematic of how the detection and switching circuit is configured for the REC/PLAYBACK THROUGH MIC/SPKR, modes 6 and 7. These modes are similar to the REC/PLAYBACK TO/FROM THE LINE modes 4 and 5, except that the audio is input from the microphone rather than a remote telephone, and the audio is played back through a speaker instead of the remote telephone. In mode 6, any audio picked up by the local microphone is digitized by the modem and then stored in the memory of the computer system. In mode 7, the stored audio file is converted back into an analog format for playback on the LDSPKR output pin of either SAFE 209 or 210 to either of the speakers 219 or 220. The message may be played back through the LDSPKR+ output of SAFE1 209 and routed through line 601 to either the on-board speaker or external speaker.

Figure 7:
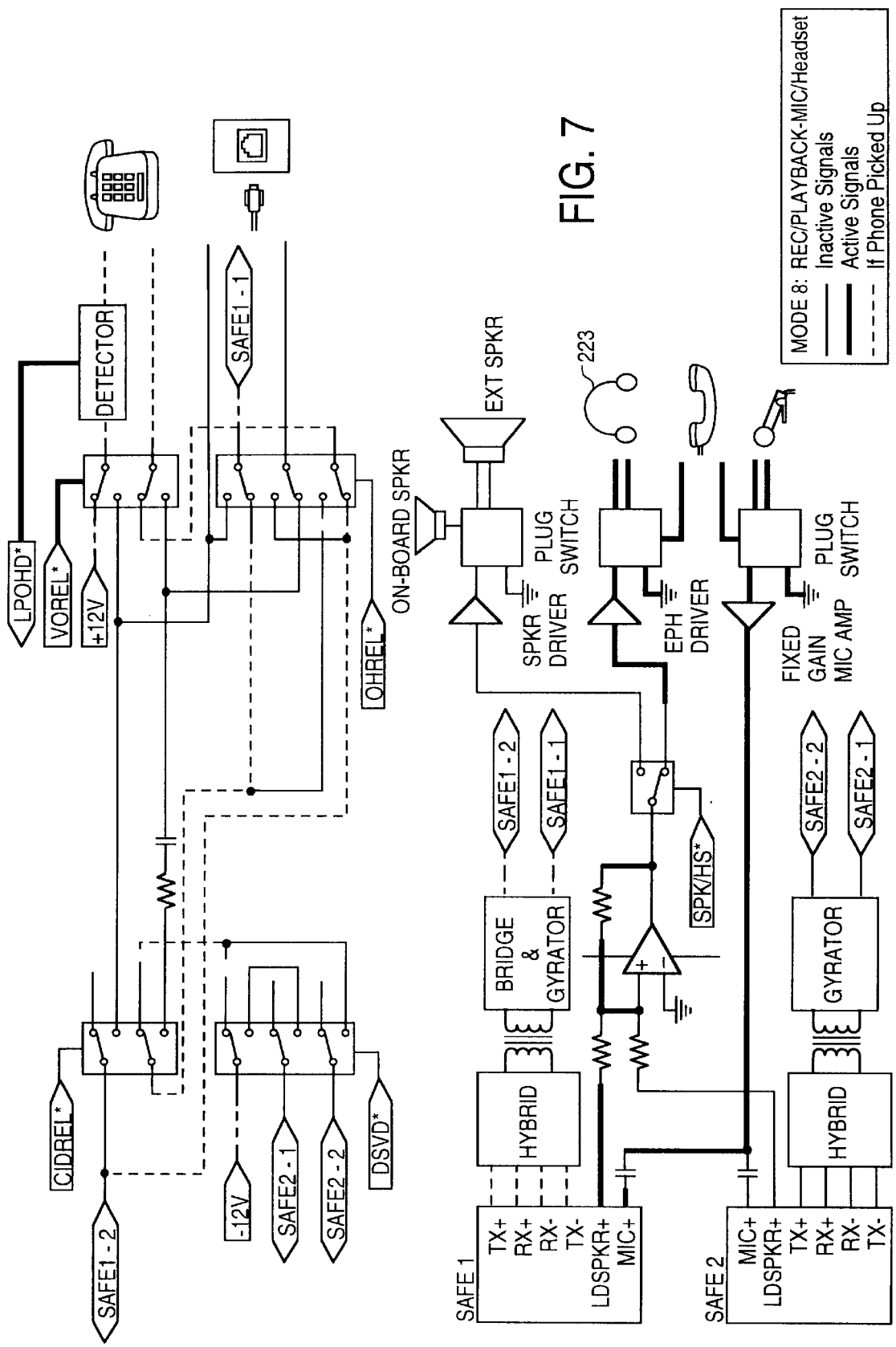
FIG. 7 shows the schematic of how the detection and switching circuit is configured for the REC/PLAYBACK-MIC/HEADSET mode.

FIG. 7 shows the schematic of how the detection and switching circuit is configured for the REC/PLAYBACK-MIC/HEADSET, mode 8. This is basically the same as described above for mode 7, except that the audio signal is played back through the headset 223.

Figure 8:
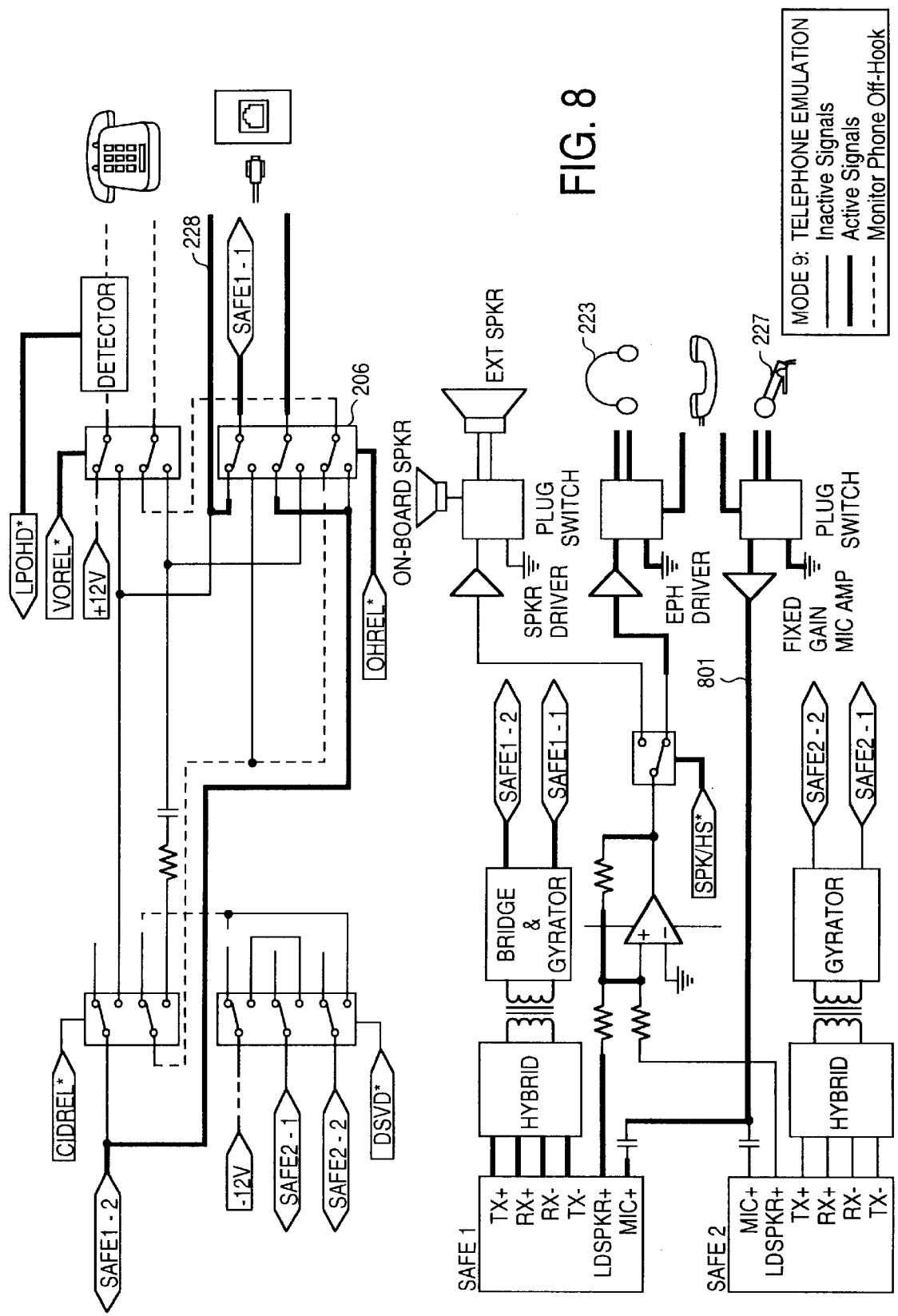
FIG. 8 shows the schematic of how the detection and switching circuit is configured for the TELEPHONE EMULATION mode.

FIG. 8 shows the schematic of how the detection and switching circuit is configured for the TELEPHONE EMULATION, mode 9. In telephone emulation, the modem basically becomes a telephone. Standard voice signals received over a phone line is input to the modem. The voice signals received by the modem are not digitized. Instead, they are amplified and then routed to the earphone of headset 223. However, the microphone signals from microphone are input to the MIC+ input of SAFE1 209 for processing. Eventually, an audio signal is output from the TX+ and TX− pins of SAFE1 209 onto the SAFE1-1 module to relay 206. The OHREL* control signal causes relay 206 to route the audio signal to the phone line 228.

Figure 9:
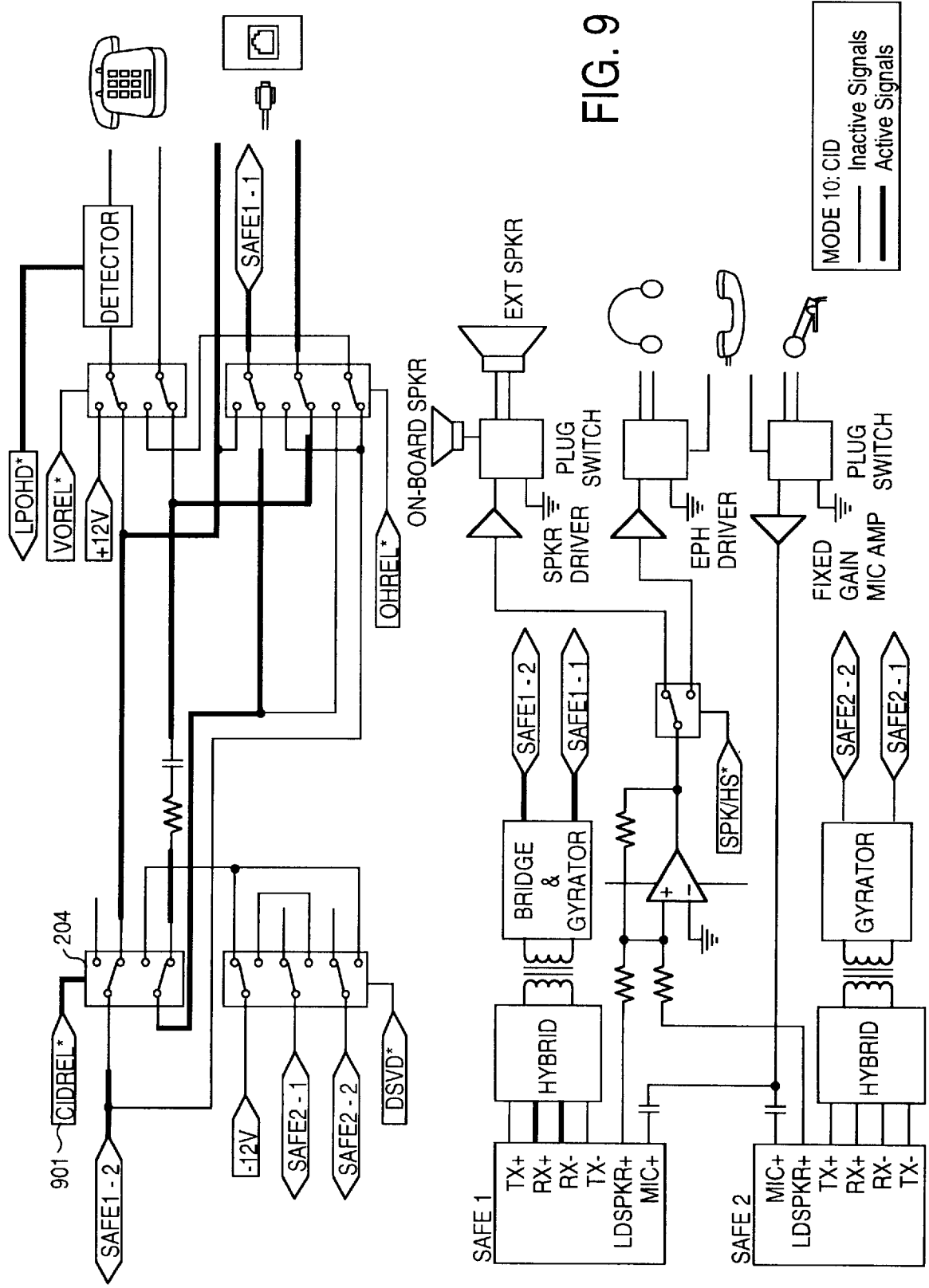
FIG. 9 shows the schematic of how the detection and switching circuit is configured for the CALLER ID (CID) mode.

FIG. 9 shows the schematic of how the detection and switching circuit is configured for the CALLER ID (CID), mode 10. Between the first and second rings, the telephone company sends an encoded data packet that contains information as to the calling party's phone number and the date and time of the call. In order to receive and process a CID packet, the modem cannot be allowed to go off-hook. Hence, after the first ring is detected, the modem controller sends a CIDREL* signal 901 to activate relay 204, which capacitively couples the phone line to the analog front-end. (An asterisk next to a signal name designates that signal as being active low). Consequently, if the modem receives the signal, but does not draw any loop current, it does not go off-hook. Thereupon, the CID packet is decoded; the caller information is displayed; and the user can decide as to whether he or she wishes to accept the call.

FIGS. 10–15 relate to schematics of different configurations of the detection and switching circuit associated with alternate voice data (AVD) functionalities. With AVD, two parties can place a call and carry on a normal voice conversation and either party may initiate a fax or data transfer during the call. When either party elects to send a fax or data file, an originate tone is transmitted by that party's modem. This originate tone is then picked up by the modem on the other end, whereupon it switches off the local telephone, receives the incoming fax or data file, and automatically switches back to the telephone once the fax or data file transfer has completed. As an example, an advertising executive may be talking over the phone with his or her client. The client wishes to see the new promotion. The advertising may at that point fax the material to the client. After the client receives the fax, they may continue with their conversation. This can be done without having to hang up or redial. In the currently preferred embodiment, the AVD functions are performed by Voice View, which is a proprietary software technique developed by the Radish corporation, located in Colorado. Voice View is basically a software package and protocol that permits a user to perform alternate voice data (AVD) functionalities. It should be noted, however, that the present invention will work with any other type of AVD technology and is not limited to Voice View.

Figure 10:
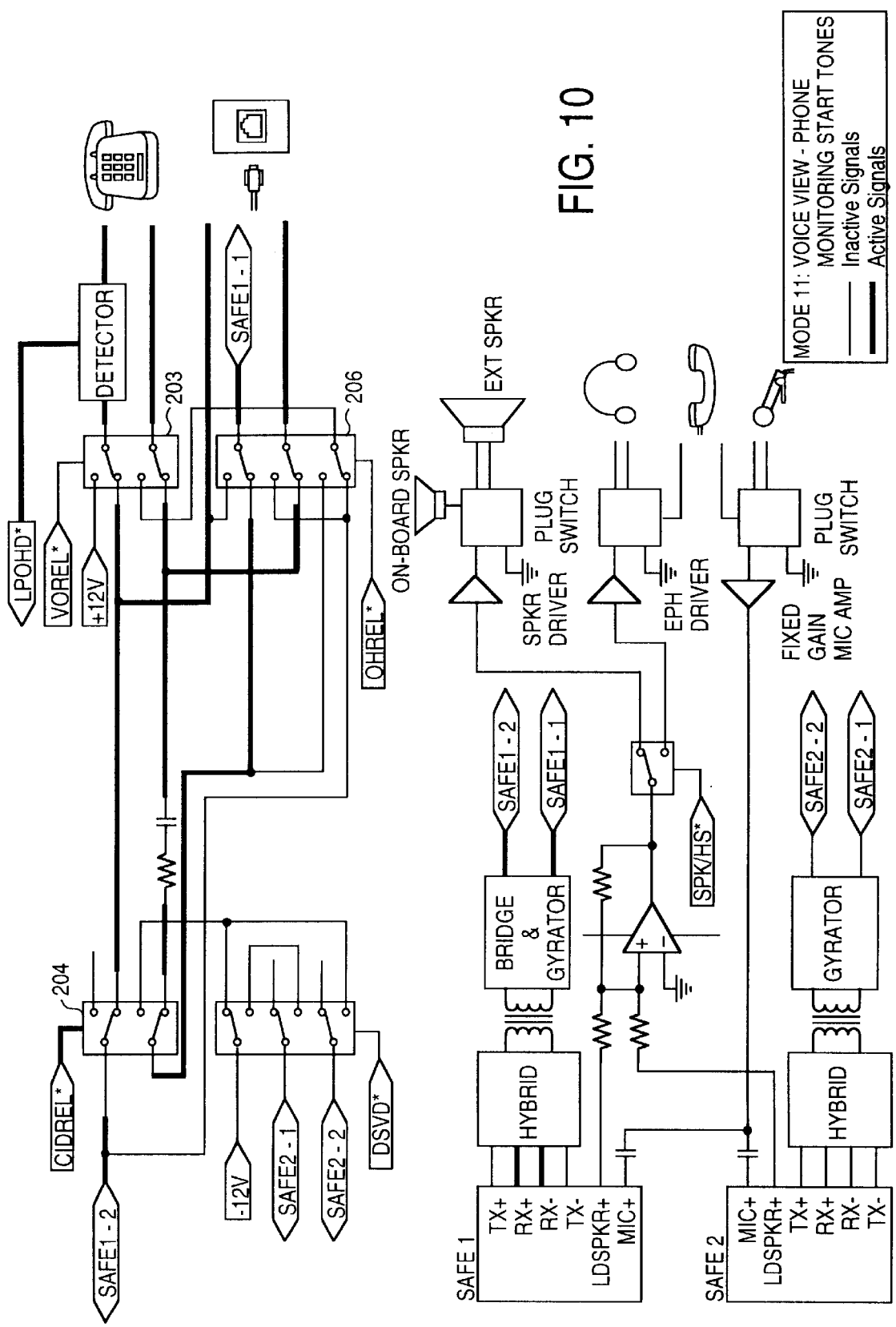
FIG. 10 shows a schematic of how the detection and switching circuit is configured for the VOICE VIEW-PHONE MONITORING START TONES mode.

FIG. 10 shows a schematic of how the detection and switching circuit is configured for the VOICE VIEW-PHONE MONITORING START TONES, mode 10. In this mode, the modem is actively monitoring the phone line during a telephone call to detect the onset of a start tone. The start tone is characterized by a unique, pre-determined frequency. Basically, control signals VOREL*, CIDREL*, and OHREL* set relays 203, 204, and 206 such that an incoming phone signal is routed to the modem. As soon as the modem detects a start tone of that particular frequency, the telephone is put on hold, and the modem starts receiving the data.

Figure 11:
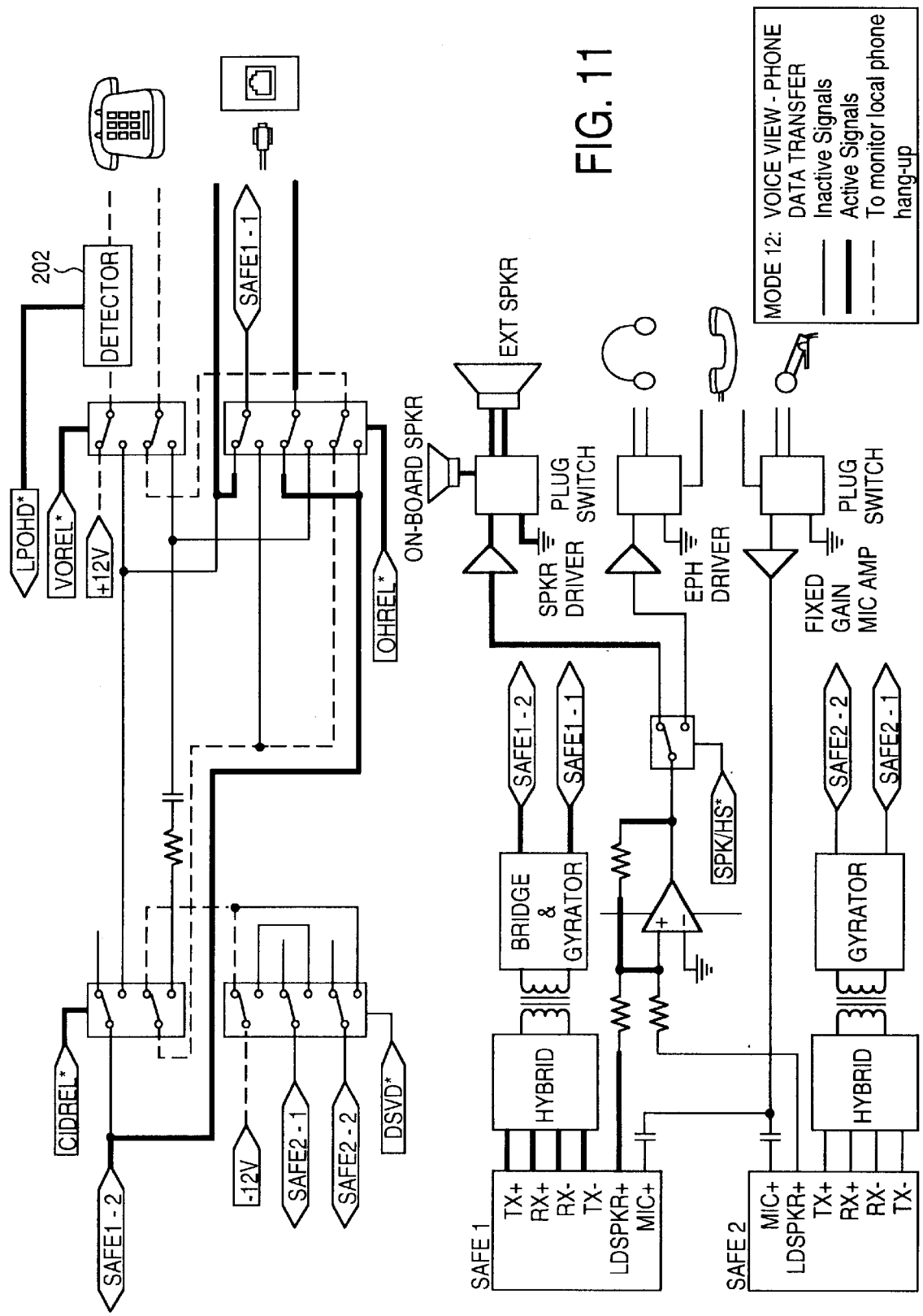
FIG. 11 shows a schematic of how the detection and switching circuit is configured for the VOICE VIEW-PHONE DATA TRANSFER mode.

Once a start tone is detected, data transfer begins. FIG. 11 shows a schematic of how the detection and switching circuit is configured for the VOICE VIEW-PHONE DATA TRANSFER, mode 12. This schematic shows how the fax or data file signals are routed to the modem. The dashed lines represent the signal paths for monitoring local telephone hang-ups. The signal paths are basically the same as that described in relation to FIG. 5, modes 4 and 5, except that LPOHD signal from detector 202 is used to determine a local phone hang-up.

Figure 12:
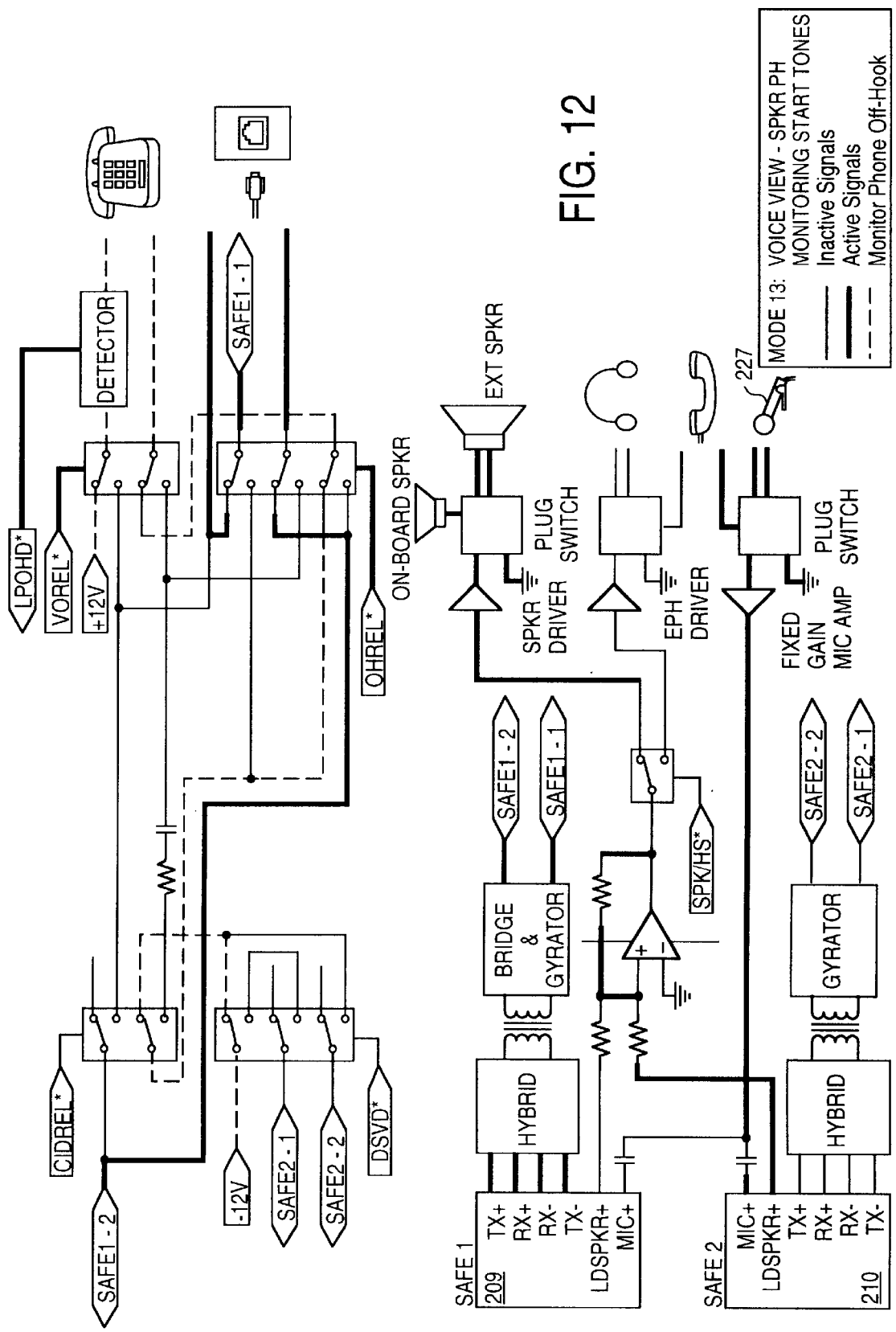
FIG. 12 shows a schematic of how the detection and switching circuit is configured for the VOICE VIEW-SPKR PH MONITORING START TONES mode.
Figure 13:
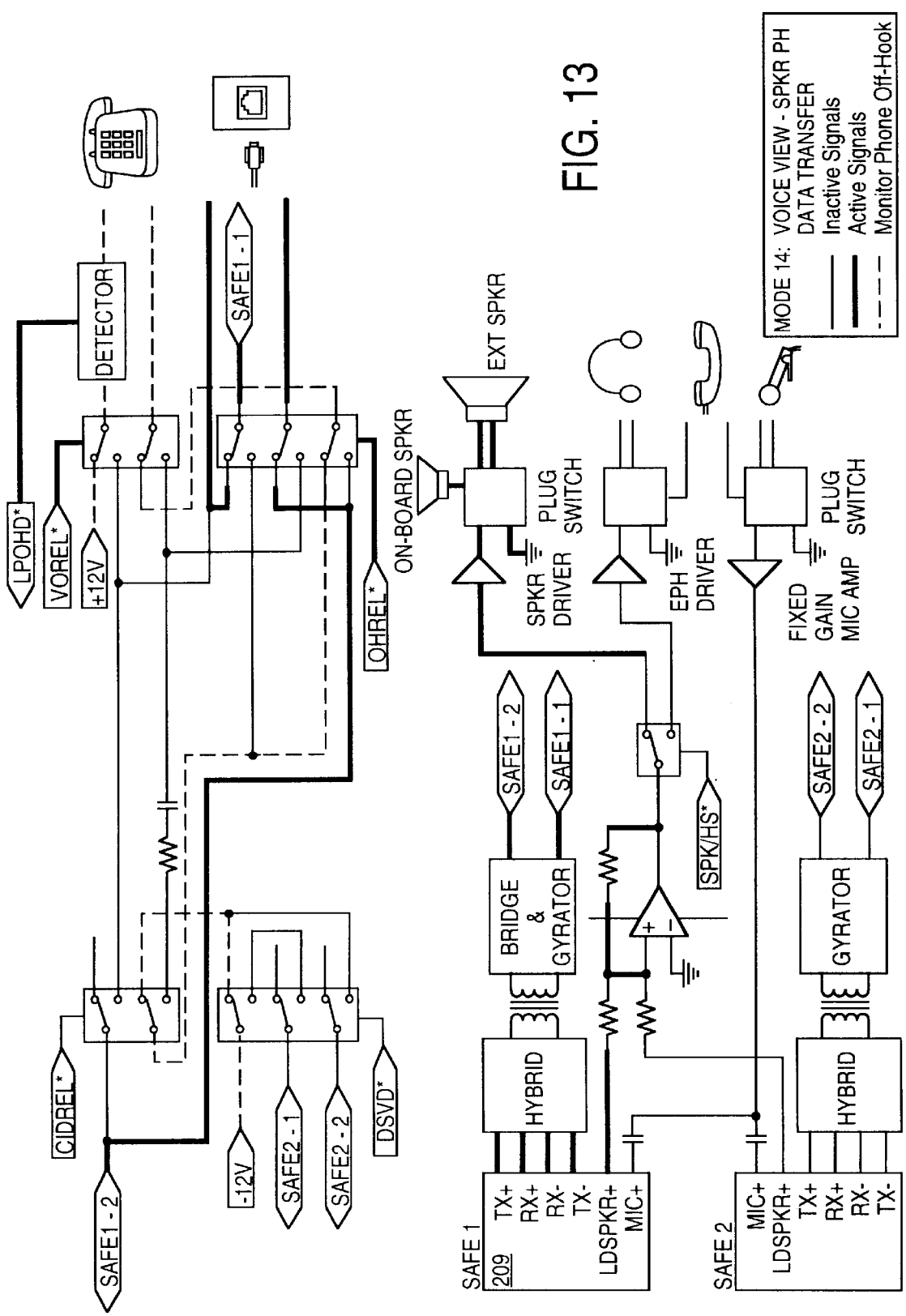
FIG. 13 shows a schematic of how the detection and switching circuit is configured for the VOICE VIEW-SPKR PH DATA TRANSFER mode.

FIG. 12 shows a schematic of how the detection and switching circuit is configured for the VOICE VIEW-SPKR PH MONITORING START TONES, mode 13. In this mode, the speaker phone (represented by microphone 227) is active. The speaker phone is always operated through the analog front-end of the second SAFE 210. The analog front-end of the first SAFE 209 is monitoring the phone line to detect the beginning of any start tone. Once a start tone has been detected, data transfer begins. FIG. 13 shows a schematic of how the detection and switching circuit is configured for the VOICE VIEW-SPKR PH DATA TRANSFER, mode 14. This mode automatically disables the speaker-phone when the start tone is detected. The speaker-phone is placed on hold throughout the duration of the incoming fax or data file transmission. The fax or data file transmission is handled by the first SAFE 209.

Figure 14:
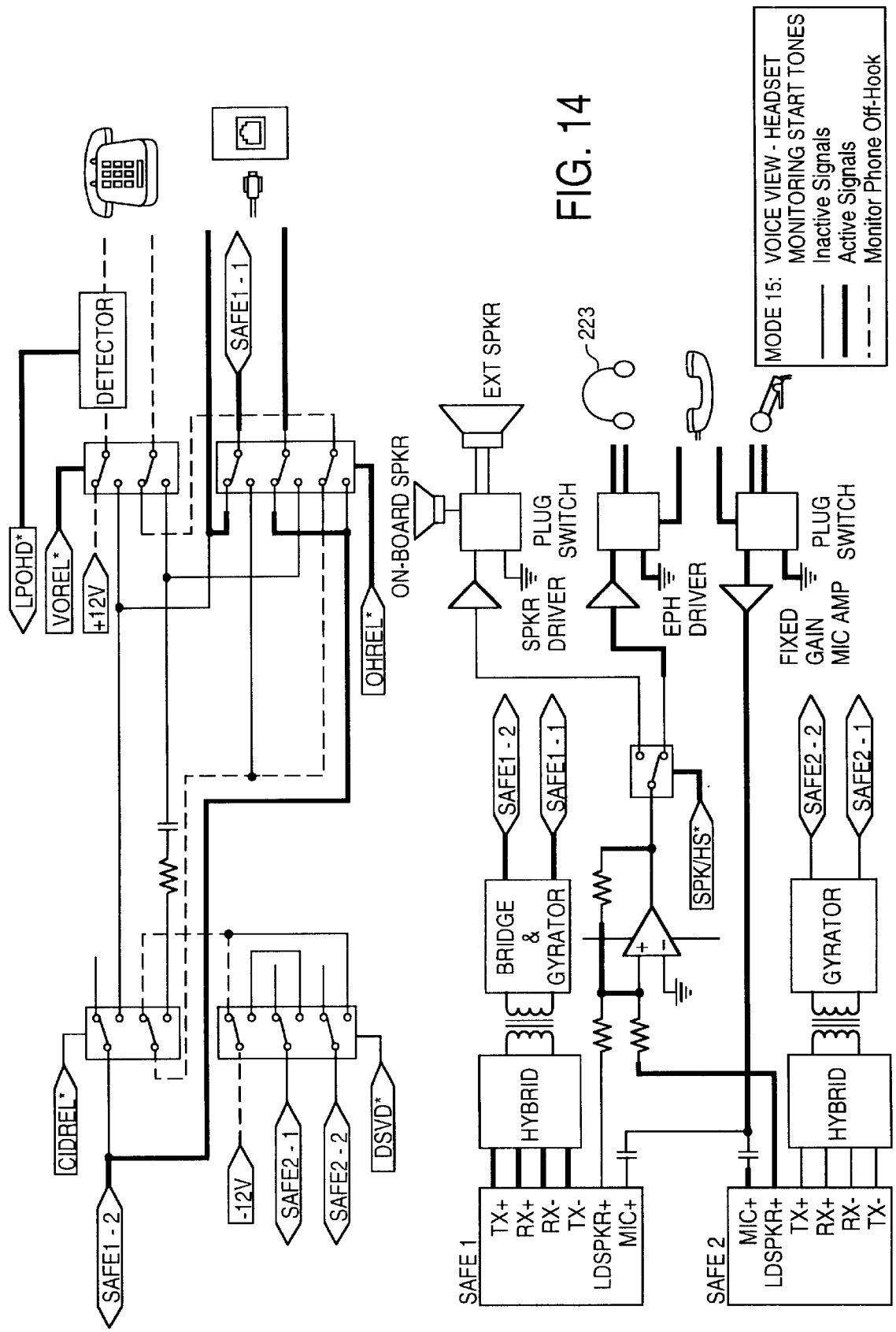
FIG. 14 shows a schematic of how the detection and switching circuit is configured for the VOICE VIEW-HEADSET MONITORING START TONES mode.
Figure 15:
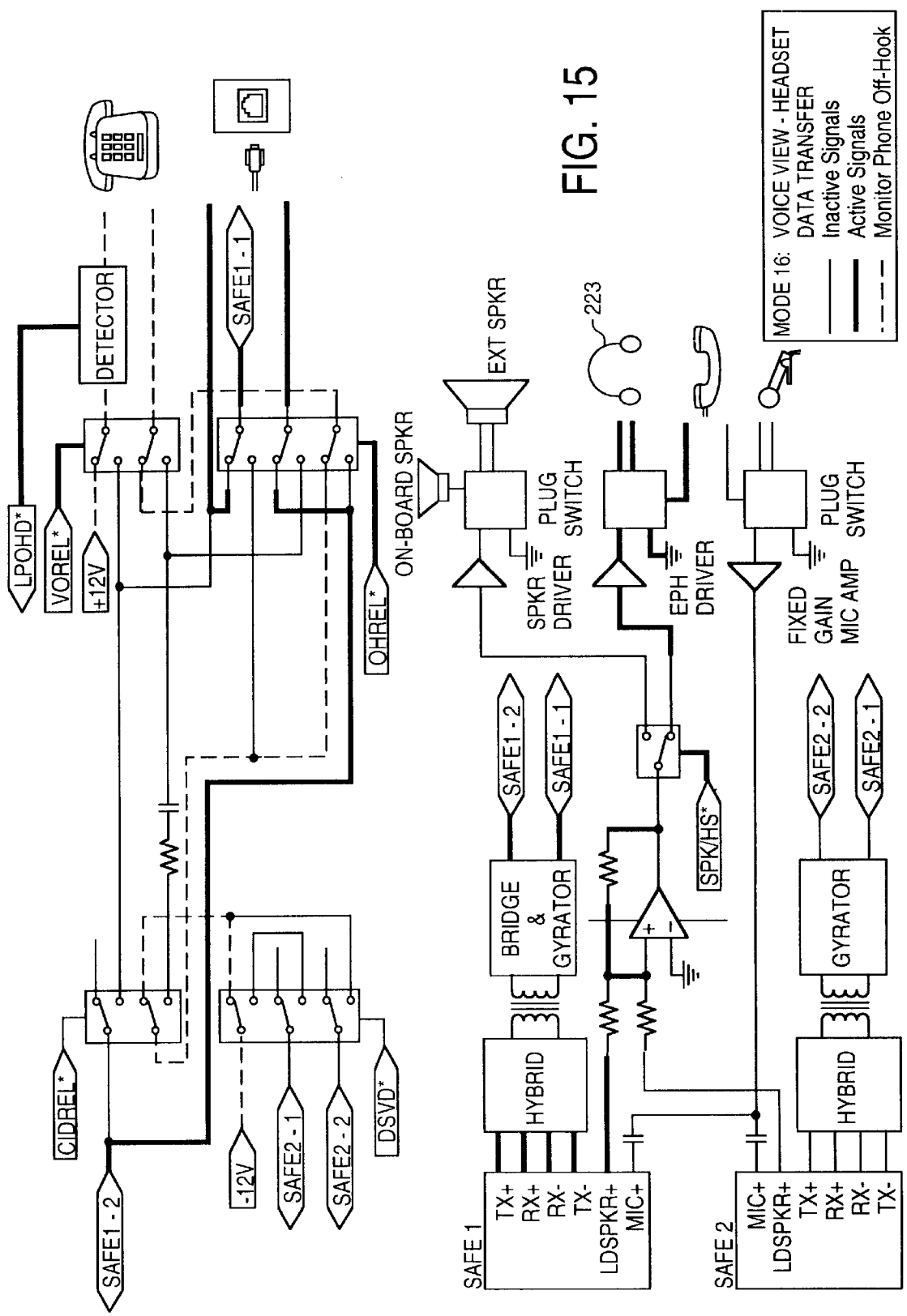
FIG. 15 shows a schematic of how the detection and switching circuit is configured for the VOICE VIEW-HEADSET DATA TRANSFER mode.

FIG. 14 shows a schematic of how the detection and switching circuit is configured for the VOICE VIEW-HEADSET MONITORING START TONES, mode 15. This mode functions in the same manner as described above for the VOICE VIEW-SPKR PH MONITORING START TONES mode 13, except that the sound is output from the earphone of headset rather than the speaker-phone. Once a start tone has been detected, data transfer begins. FIG. 15 shows a schematic of how the detection and switching circuit is configured for the VOICE VIEW-HEADSET DATA TRANSFER, mode 16. This mode functions in the same manner as described above for the VOICE VIEW-SPKR PH DATA TRANSFER mode 14, except that the earphone 223 is disabled, rather than the speaker-phone.

Figure 16:
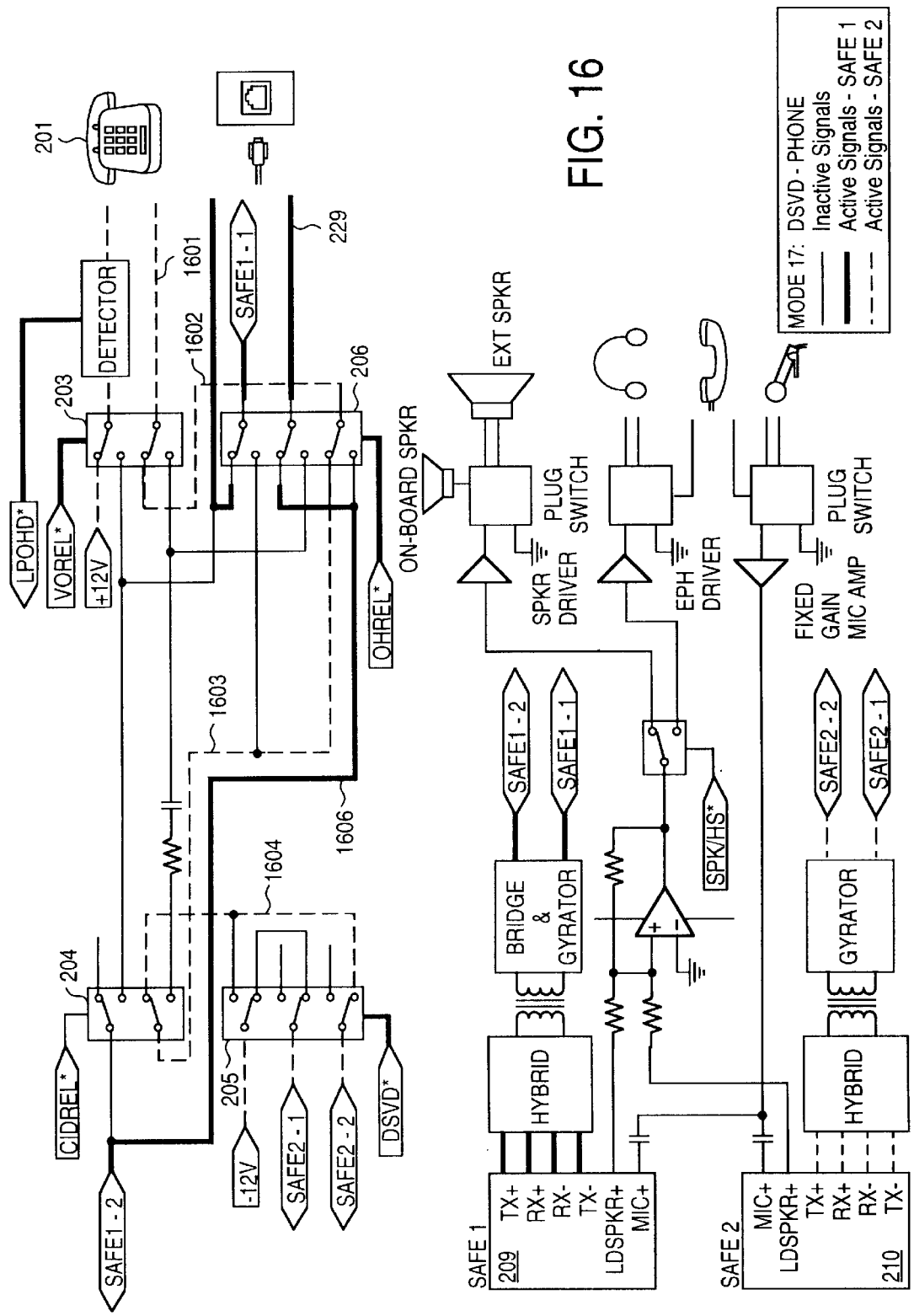
FIG. 16 shows a schematic of how the detection and switching circuit is configured for the DSVD-PHONE mode.

FIG. 16 shows a schematic of how the detection and switching circuit is configured for the DSVD-PHONE, mode 17. This mode is directed to performing digital simultaneous voice and data (DSVD). In this mode, the voice/audio signal from the telephone is digitized. The digitized voice/audio signal is then merged with digital data (e.g., fax or data file) to form a digital data stream. This digital data stream is then sent over the phone line, similar to a regular fax transmission. At the other end, the data and voice are separated. The voice message is routed to the telephone, while the data message is routed to the computer or printer for display. By thusly interleaving voice with data signals, the parties can continue to carry on their phone conversation in conjunction with the transmission of data. The advantage is that there is no interruption in the voice communications. One enhancement to DSVD is to vary the data speed of the modem in accordance with the voice traffic. In other words, data can be sent at a faster rate during those moments when there is silence on the phone line.

Referring back to FIG. 16, a schematic diagram of how the detection and switching circuit of the present invention can be configured to support the DSVD feature is shown. It should be noted that both SAFE1 209 and SAFE2 210 are used in this mode. The active signals corresponding to SAFE2 210 are shown as dashed lines 1601–1604. An audio signal from telephone 201 is input to SAFE2 210 via these dashed lines 1601–1604 by setting relays 203–206 according to the VOREL*, CIDREL*, DSVD*, and OHREL* control signals. By thusly setting relays 204 and 206, a direct connection is also established between phone line and SAFE1 209 via line 1602 and the SAFE1-2 module.

Figure 17:
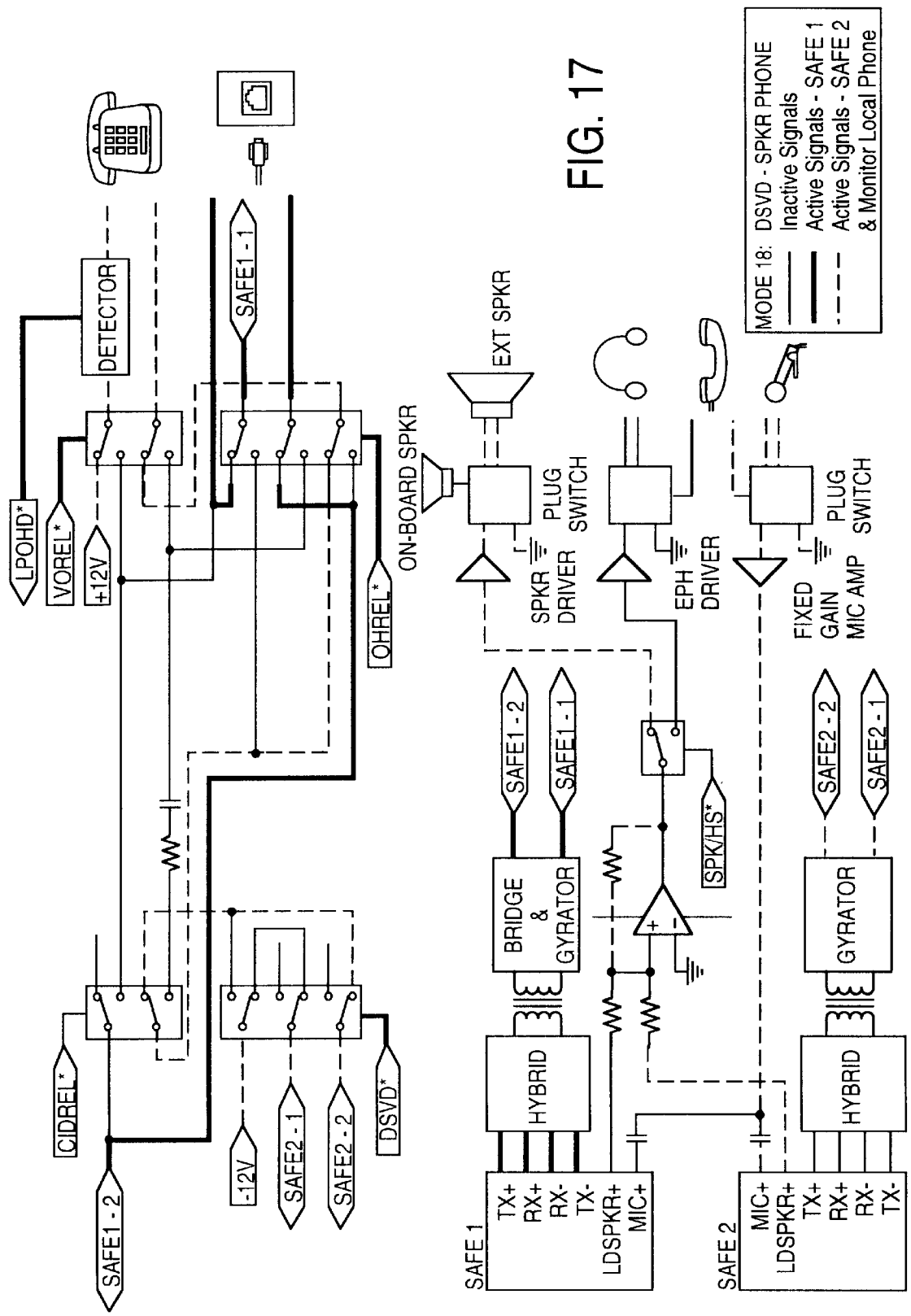
FIG. 17 shows a schematic of how the detection and switching circuit of the present invention can be configured to provide DSVD-SPKR PHONE mode.
Figure 18:
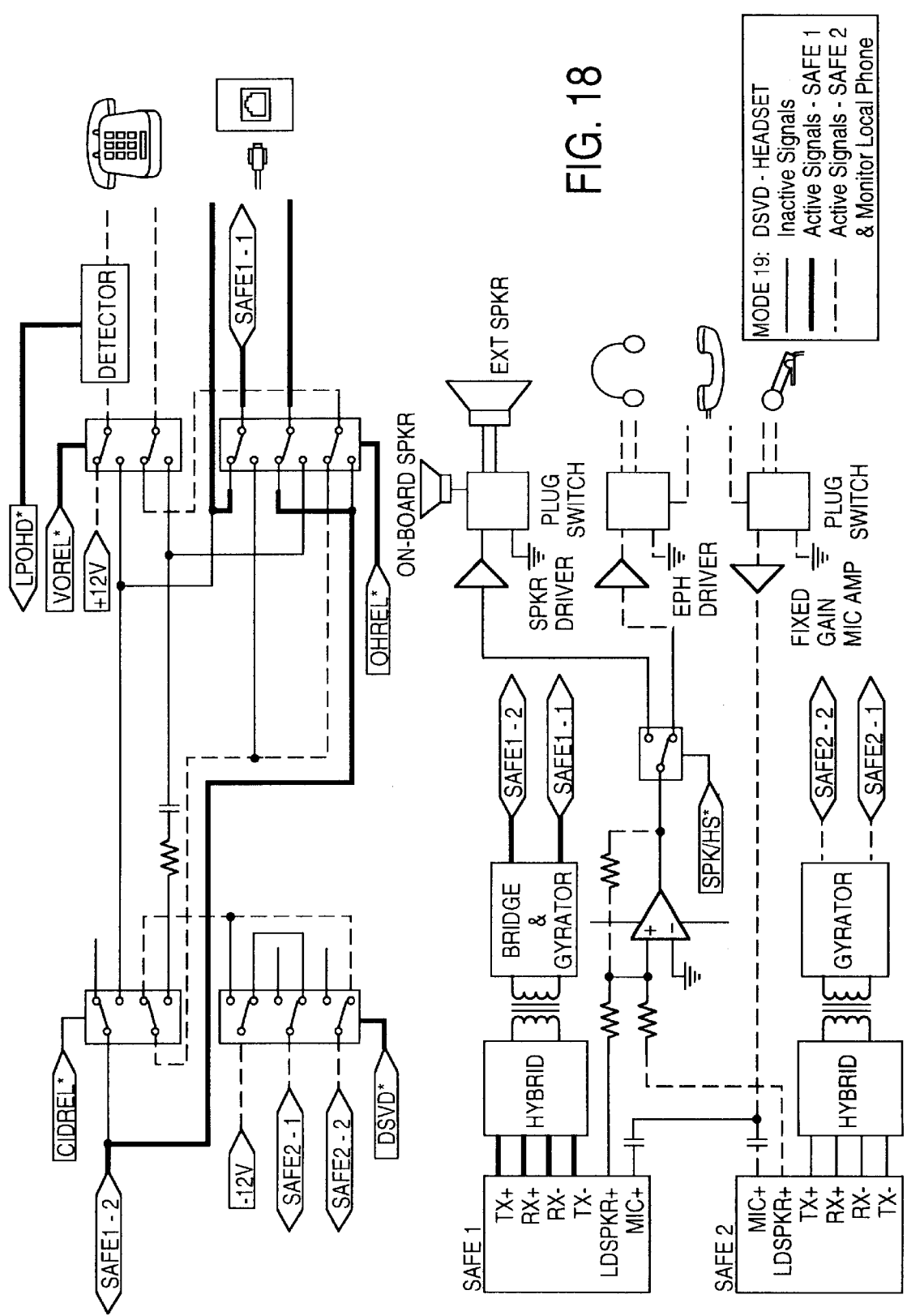
FIG. 18 shows a schematic of how the detection and switching circuit of the present invention can be configured to provide DSVD-HEADSET mode.

This DSVD function can also be applied so that the audio is routed to the speaker-phone. FIG. 17 shows a schematic of how the detection and switching circuit of the present invention can be configured to provide DSVD SPKR PHONE, mode 18. Likewise, the DSVD function can also be applied so the audio is routed through to the headset, as shown in FIG. 18 DSVD-HEADSET, mode 19.

Figure 19:
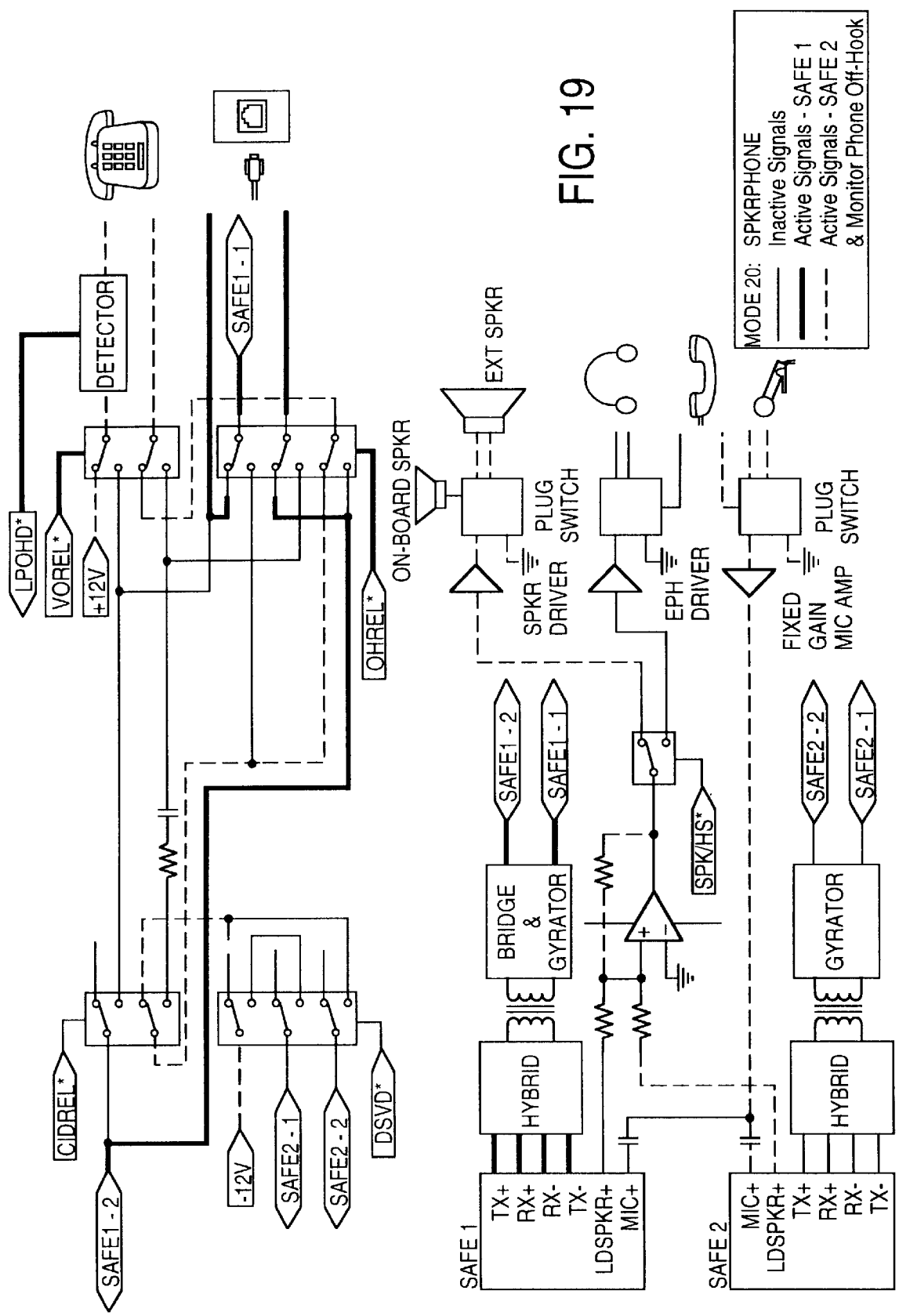
FIG. 19 shows a schematic of how the detection and switching circuit is configured for the SPKRPHONE mode.

FIG. 19 shows a schematic of how the detection and switching circuit is configured for the SPKRPHONE, mode 20. This SPKRPHONE mode is basically the same as that of the telephone, except that the audio signal is routed so that the conversation is carried on privately through the speaker-phone.

Figure 20:
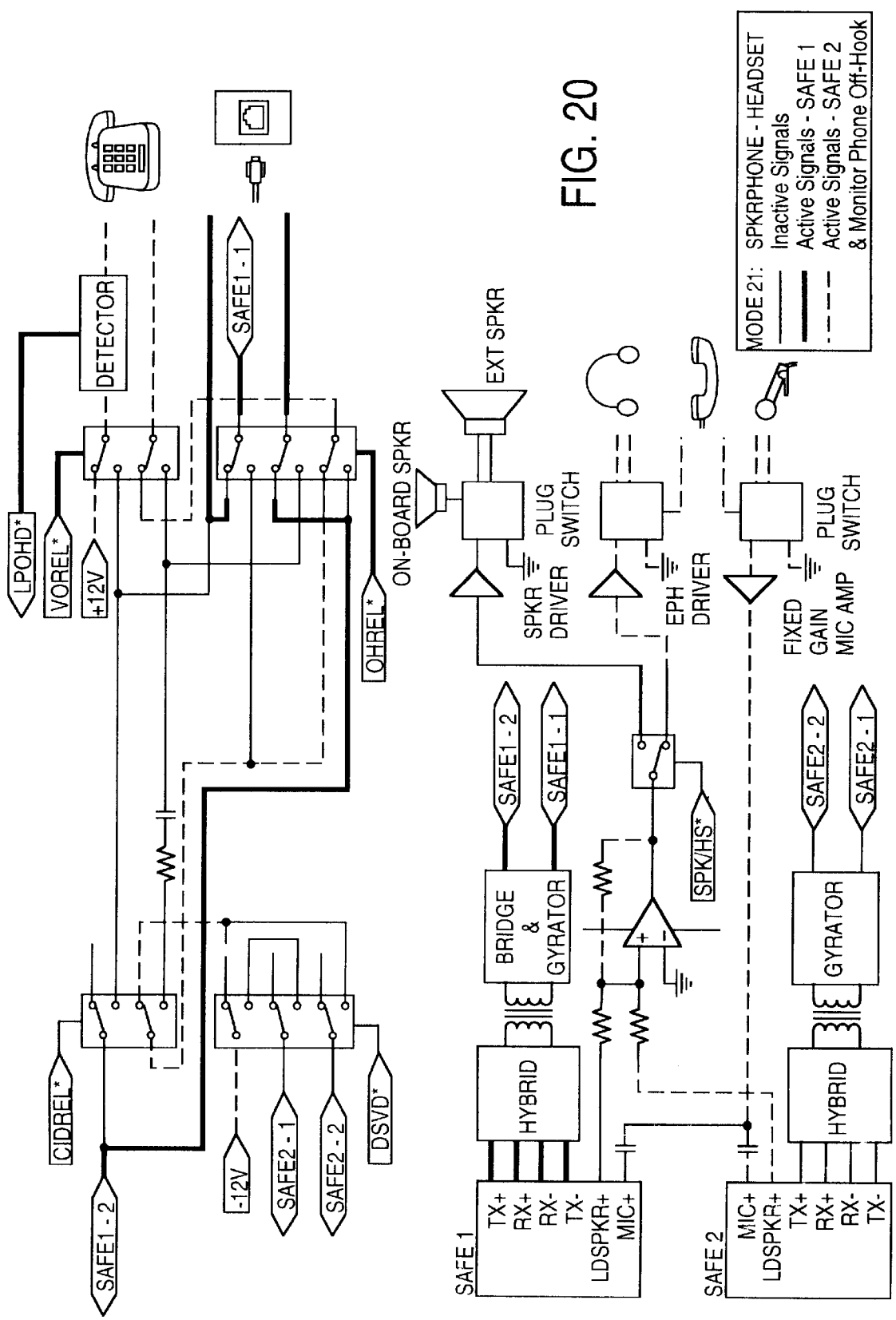
FIG. 20 shows a schematic of how the detection and switching circuit is configured for the SPKRPHONE-HEADSET mode.

FIG. 20 shows a schematic of how the detection and switching circuit is configured for the SPKRPHONE-HEADSET, mode 21. This SPKRPHONE-HEADSET mode is basically the same as that of the telephone, except that the audio signal is routed so that the conversation is carried on through the headset.

What is claimed is:

1. A switching circuit for routing signals between a modem and a telephone coupled to a computer system, the switching circuit comprising:

a first relay coupled to the telephone for routing an off-hook indication signal indicating whether the telephone is off-hook to the computer system;

a second relay coupled to the first relay means for routing an analog audio signal from a telephone, through the modem and second relay means, for transmission over a telephone line;

a third relay coupled to the second relay means for routing a caller identification signal containing caller identification information;

a fourth relay coupled to the third relay means for routing a digital simultaneous voice signal and a data signal;

a converter coupled to the third relay for converting an analog audio signal into a digital signal input to the modem and for converting a digital signal into an analog signal, wherein the first relay, the second relay, the third relay, the fourth relay, and the converter are controlled by software associated with the computer system to route signals between the modem and the telephone according to a mode of operation that is selected by a user.

2. The switching circuit of claim 1 further comprising a detector for detecting when the telephone coupled to the computer system goes off-hook.

3. The switching circuit of claim 1 further comprising a switch for switching an audio signal to an external speaker or to an on-board speaker.

4. The switching circuit of claim 1, further comprising a speaker-phone, a microphone, and a headset coupled to the telephone.

5. The switching circuit of claim 1, wherein the mode of operation is one of: recording through the telephone, playback to the telephone, recording through the phone line, playback to the phone line, alternate voice data, and digital simultaneous voice and data.

6. The switching circuit of claim 1 further comprising:

a means for converting a two-wire phone line into a four-wire transmit and receive interface for the modem;

a bridge and gyrator means for maintaining telephone connection.

7. In a system having a computer, a modem, a telephone, and an input/output device, a method for routing signals between the computer, the modem, the telephone, and the input/output device, comprising the steps of:

routing an off-hook indication signal indicating whether the telephone is off-hook to the computer system through a first relay coupled to the telephone;

routing an analog audio signal from a telephone, through the modem and second relay means, for transmission over a telephone line through a second relay coupled to the first relay;

routing a caller identification signal containing caller identification information through a third relay coupled to the second relay;

routing a digital simultaneous voice signal and data signal through a fourth relay coupled to the third relay;

converting an analog audio signal into a digital signal input to the modem;

converting a digital signal into an analog signal, wherein the first relay, the second relay, the third relay, the fourth relay, and a converter for performing the converting steps, are controlled by software associated with the computer to route signals between the modem, the telephone, and the input/output device according to a mode of operation that is selected by a user.

8. The method of claim 7 further comprising the step of detecting when the telephone coupled to the computer goes off-hook.

9. The method of claim 7 further comprising the step of switching an audio signal to an external speaker or to an on-board speaker.

10. The method of claim 7, wherein the input/output device is one of a speaker-phone, a microphone, or a headset coupled to the telephone.

11. The method of claim 7, wherein modes of operation include:
recording through the telephone;
playing back to the telephone;
recording through the phone line;
playing back to the phone line;
alternating voice signals and data signals.

12. The method of claim 7 further comprising the steps of:
converting a two-wire phone line into a four-wire transmit and receive interface for the modem;
maintaining telephone connection by implementing a bridge and gyrator circuit.

* * * * *